United States Patent
Kinoshita

(10) Patent No.: US 9,344,752 B2
(45) Date of Patent: May 17, 2016

(54) CONTENT REPRODUCTION SYSTEM AND CONTENT REPRODUCTION METHOD

(75) Inventor: Akihiko Kinoshita, Tokyo (JP)

(73) Assignee: Sony Corporation (JP)

( * ) Notice: Subject to any disclaimer, the term of this patent is extended or adjusted under 35 U.S.C. 154(b) by 323 days.

(21) Appl. No.: 12/930,841

(22) Filed: Jan. 19, 2011

(65) Prior Publication Data

US 2011/0185379 A1 Jul. 28, 2011

(30) Foreign Application Priority Data

Jan. 26, 2010 (JP) ................ P2010-014193

(51) Int. Cl.
*H04N 7/16* (2011.01)
*H04N 21/45* (2011.01)
(Continued)

(52) U.S. Cl.
CPC .... *H04N 21/41407* (2013.01); *G11B 20/00086* (2013.01); *G11B 20/00152* (2013.01);
(Continued)

(58) Field of Classification Search
CPC .......... H04N 21/4532; H04N 21/4751; H04N 21/44213; H04N 21/44231; H04N 21/454; H04N 21/4542; H04N 21/4753; H04N 7/165; H04N 7/166; H04N 21/4126; H04N 21/441; H04N 21/44218; H04N 21/4755; H04N 21/41407; H04N 21/4316; H04N 21/482; H04N 21/4821; H04N 5/44543; H04N 21/4135; H04N 21/4325; G11B 20/00086; G11B 20/00152; G11B 20/00159; G11B 27/105
USPC .................. 725/25–28, 30–31; 379/143–155; 455/26.1, 411
See application file for complete search history.

(56) References Cited

U.S. PATENT DOCUMENTS

2004/0128145 A1* 7/2004 Sato ................................... 705/1
2005/0028191 A1* 2/2005 Sullivan et al. ................. 725/28
(Continued)

FOREIGN PATENT DOCUMENTS

JP 9-037168 A 2/1997
JP 2000-175117 A 6/2000
(Continued)

OTHER PUBLICATIONS

IBM, Parental Control for TV, Jan. 29, 2009, ip.com, IPCOM000178905D, 3.*
(Continued)

*Primary Examiner* — Benjamin R Bruckart
*Assistant Examiner* — Jen-Shi Huang
(74) *Attorney, Agent, or Firm* — Lerner, David, Littenberg, Krumholz & Mentlik, LLP

(57) ABSTRACT

Provided is a content reproduction system including a content reproduction apparatus including a first receiving unit receiving a request for a list of reproducible content and a content reproduction request, each transmitted from an information processing apparatus, a confirmation unit confirming predetermined information attached to the request for a content-list having received by the first receiving unit, a generation unit generating a content-list to be transmitted to the information processing apparatus, based on confirmation-results by the confirmation unit, and a first transmitting unit transmitting the content-list generated by the generation unit to the information processing apparatus, and the information processing apparatus including a second transmitting unit transmitting a request for a list of reproducible content and a content reproduction request to the content reproduction apparatus, a second receiving unit receiving a content-list transmitted from the content reproduction apparatus, and a display unit displaying the content-list received by the receiving unit.

10 Claims, 13 Drawing Sheets

| CONTENT LIST | PARENTAL CONTROL | PARENT 1 | PARENT 2 | CHILD 1 | CHILD 2 |
|---|---|---|---|---|---|
| SUHAITER-MAN | ✗ | O (TRANSMISSION ALLOWED) | O (TRANSMISSION ALLOWED) | O (TRANSMISSION ALLOWED) | |
| TIE-HARD | | O (TRANSMISSION ALLOWED) | | | |
| MEN IN WHITE | | | O (TRANSMISSION ALLOWED) | | |
| A.T. | ✗ | O (TRANSMISSION ALLOWED) | | | |

(51) Int. Cl.
*H04N 21/475* (2011.01)
*H04N 21/442* (2011.01)
*H04N 21/454* (2011.01)
*H04N 21/414* (2011.01)
*G11B 20/00* (2006.01)
*G11B 27/10* (2006.01)
*H04N 21/41* (2011.01)
*H04N 21/432* (2011.01)
*H04N 21/482* (2011.01)

(52) U.S. Cl.
CPC ........ *G11B20/00159* (2013.01); *G11B 27/105* (2013.01); *H04N 21/4135* (2013.01); *H04N 21/4325* (2013.01); *H04N 21/4532* (2013.01); *H04N 21/4753* (2013.01); *H04N 21/482* (2013.01)

(56) References Cited

U.S. PATENT DOCUMENTS

| | | | |
|---|---|---|---|
| 2008/0097984 A1* | 4/2008 | Candelore | 707/5 |
| 2008/0133544 A1* | 6/2008 | Fujimoto | 707/10 |
| 2008/0151702 A1* | 6/2008 | Yuasa et al. | 369/24.01 |
| 2009/0073839 A1* | 3/2009 | Yakuwa | 369/53.44 |
| 2009/0138921 A1* | 5/2009 | Miyata | 725/80 |
| 2009/0235300 A1* | 9/2009 | Hayashi | 725/28 |
| 2010/0103316 A1* | 4/2010 | Colsey et al. | 348/552 |
| 2011/0030009 A1* | 2/2011 | Mountain | 725/44 |

FOREIGN PATENT DOCUMENTS

| | | |
|---|---|---|
| JP | 2000354231 A | 12/2000 |
| JP | 2002-335488 A | 11/2002 |
| JP | 2005063519 A | 3/2005 |
| JP | 2005-340972 A | 12/2005 |
| JP | 2008-077442 A | 4/2008 |
| JP | 2009094800 A | 4/2009 |
| JP | 2009219072 A | 9/2009 |
| WO | 2009067676 A1 | 5/2009 |

OTHER PUBLICATIONS

Dhaval K Shah, Sandeep Ramesh Patil, Ankur Bk Shah, Dwip N Banerjee, Intelligent Method for Finer Control over Content Screening on Systems, Nov. 11, 2008, ip.com, IPCOM000176271D, 2.*
IBM (Parental Control for TV, Jan. 29, 2009, ip.com, IPCOM000178905D, 3).*
Office Action from Japanese Application No. 2010-014193, dated Sep. 3, 2013.
Office Action from Chinese Application No. 2011-10021253.3, dated Jul. 2, 2014.

* cited by examiner

FIG.13

| CONTENT LIST | PARENTAL CONTROL | PARENT 1 | PARENT 2 | CHILD 1 | CHILD 2 |
|---|---|---|---|---|---|
| SUHAITER-MAN | × | ○ (TRANSMISSION ALLOWED) | ○ (TRANSMISSION ALLOWED) | ○ (TRANSMISSION ALLOWED) | |
| TIE-HARD | | ○ (TRANSMISSION ALLOWED) | | | |
| MEN IN WHITE | | | ○ (TRANSMISSION ALLOWED) | | |
| A.T. | × | ○ (TRANSMISSION ALLOWED) | ○ (TRANSMISSION ALLOWED) | | |

CONTENT REPRODUCTION SYSTEM AND CONTENT REPRODUCTION METHOD

CROSS-REFERENCE TO RELATED APPLICATION

The present application claims priority from Japanese Patent Application No. JP 2010-014193 filed in the Japanese Patent Office on Jan. 26, 2010, the entire content of which is incorporated herein by reference.

BACKGROUND OF THE INVENTION

1. Field of the Invention

The present invention relates to a content reproduction system and a content reproduction method.

2. Description of the Related Art

In recent years, a content reproduction apparatus that reproduces content such as a broadcast program and a DVD is equipped with a parental control function, referred as to a parental lock, by which a parent restricts content that his/her child may watch, for example, in order to make it impossible for his/her child to freely watch an x-rated program or the like (see JP-A-H9-37168, JP-A-2000-175117, JP-A-2002-335488, JP-A-2005-340972 and JP-A-2008-77442, for example).

For example, parental control information is attached by a broadcaster or the like to an x-rated program or the like that a parent does not probably want his/her child to watch. And when the above parental lock function is enabled on a content reproduction apparatus, the content reproduction apparatus does not display content to which the parental control information is attached (hereafter, referred as to "parental controlled content") in displaying reproducible content and avoids being instructed to reproduce parental controlled content. Further, the content reproduction apparatus restricts reproduction of parental controlled content in such a manner that, when the content reproduction apparatus is instructed to display parental controlled content, the content reproduction apparatus requests for input of a passcode which is previously set by an administrator such as a parent, and displays the parental controlled content only when the passcode is verified.

SUMMARY OF THE INVENTION

Incidentally, in the above content reproduction apparatus, the parental lock function is preferably constantly enabled, for example, in order to permanently prevent a child from watching an x-rated program or the like. For this reason, when a user such as a parent, who is not subject to parental control over parental controlled content, wants to give an instruction for parental controlled content to be displayed, it is necessary to disenable the parental lock function in each case by inputting a passcode as described above. And after reproduction of the parental controlled content, input of a passcode as described above is to be performed again in order to newly enable the parental lock function and there was an issue that it was troublesome for a parent to perform these procedures.

Therefore, in the above content reproduction apparatus, there was an issue that, when the parental lock function was enabled, usability for a user in content reproduction could not be enhanced.

In light of the foregoing, it is desirable to provide a content reproduction system and a content reproduction method, which are novel and improved, and which are capable of enhancing usability for a user in content reproduction when the parental control function is enabled.

According to an embodiment of the present invention, there is provided a content reproduction system including a content reproduction apparatus including a first receiving unit that receives a request for a list of reproducible content and a request for reproduction of content, which are transmitted from an information processing apparatus, a confirmation unit that confirms predetermined information attached to the request for a content list, which has been received by the first receiving unit, a generation unit that generates a content list to be transmitted to the information processing apparatus, based on results of confirmation by the confirmation unit, and a first transmitting unit that transmits the content list generated by the generation unit to the information processing apparatus, and the information processing apparatus including a second transmitting unit that transmits a request for a list of reproducible content and a request for reproduction of content to the content reproduction apparatus, a second receiving unit that receives a content list transmitted from the content reproduction apparatus, and a display unit that displays the content list having been received by the second receiving unit.

The content reproduction apparatus may include a first input unit that accepts setting input of passcode information as the predetermined information. The information processing apparatus may include a second input unit that accepts input of passcode information as the predetermined information. When the input of passcode information is accepted by the second input unit, the second transmitting unit may transmit to the content reproduction apparatus a request for a list of reproducible content and a request for reproduction of content, each of the requests having the passcode information attached thereto.

The generation unit may generate a content list including parental controlled content to which parental control information is attached when the passcode information is verified by the confirmation unit, and may generate a content list excluding the parental controlled content when the passcode information is not verified by the confirmation unit.

The display unit may perform display for clearly showing the parental controlled content, when displaying a content list including the parental controlled content.

The information processing apparatus may include a third input unit that accepts input of display allowance setting information which allows display of a content list including all reproducible content or display disallowance setting information which disallows display of a content list including all reproducible content as the predetermined information. The second transmitting unit may transmit to the content reproduction apparatus a request for a list of reproducible content and a request for reproduction of content, each of the requests having the display allowance setting information or display disallowance setting information attached thereto.

The generation unit may generate a content list including parental controlled content to which parental control information is attached when the display allowance setting information is confirmed by the confirmation unit, and may generate a content list excluding the parental controlled content when the display disallowance setting information is confirmed by the confirmation unit.

The content reproduction apparatus may include a fourth input unit that accepts input of device information of the information processing apparatus as the predetermined information. The fourth input unit may accept setting input of display allowance setting information which allows display of a content list including all reproducible content or display disallowance setting information which disallows display of a content list including all reproducible content with regard to the accepted device information. The second transmitting unit may transmit to the content reproduction apparatus a request for a list of reproducible content and a request for reproduction of content, each of the requests having the device information attached thereto.

The generation unit may generate a content list including parental controlled content to which parental control information is attached when the device information to which the display allowance setting information has been set is confirmed by the confirmation unit, and may generate a content list excluding the parental control content when the device information to which the display disallowance setting information has been set is confirmed by the confirmation unit.

The content reproduction apparatus may include a fifth input unit that accepts input of device information of the information processing apparatus as the predetermined information. The fifth input unit may accept setting input of transmission allowance setting information for allowing transmission of any content and transmission disallowance setting information for disallowing transmission of any content with regard to the accepted device information. The second transmitting unit may transmit to the content reproduction apparatus a request for a list of reproducible content and a request for reproduction of content, each of the requests having the device information attached thereto.

The generation unit may generate a content list to be transmitted to the information processing unit, based on transmission allowance setting information and transmission disallowance setting information, which are set to the device information having been confirmed by the confirmation unit.

According to another embodiment of the present invention, there is provided a content reproduction system including a content reproduction apparatus including a third receiving unit that receives a request for a list of reproducible content and a request for reproduction of content, which are transmitted from an information processing apparatus, a calculation unit that calculates the age of a user of the information processing apparatus, based on predetermined information attached to the request for a content list having been received by the third receiving unit, a generation unit that generates a content list to be transmitted to the information processing apparatus, based on results of calculation by the calculation unit, and a third transmitting unit that transmits the content list generated by the generation unit to the information processing apparatus, and the information processing apparatus including a fourth transmitting unit that transmits a request for a list of reproducible content and a request for reproduction of content to the content reproduction apparatus, a fourth receiving unit that receives a content list transmitted from the content reproduction apparatus, and a display unit that displays a content list having been received by the fourth receiving unit.

The information processing apparatus may include a sixth input unit that accepts setting input of birth date information of a user of the information processing apparatus as the predetermined information. The fourth transmitting unit may transmit to the content reproduction apparatus a request for a list of reproducible content and a request for reproduction of content, each of the requests having the birth date information attached thereto.

When, as a result of calculation by the calculation unit of the age of the user of the information processing apparatus, the user of the information processing apparatus is a user under the age in which one is subject to parental control over parental controlled content to which parental control information is attached, the generation unit may generate a content list excluding the parental controlled content and may generate, when the user of the information processing apparatus is a user under the age in which one is not subject to parental control over certain parental controlled content of the parental controlled content, a content list only including the certain parental controlled content of the parental controlled content.

The content reproduction apparatus may include a seventh input unit that accepts input of device information of the information processing apparatus as the predetermined information. The seventh input unit may accept setting input of birth date information of a user of the information processing apparatus with regard to the accepted device information. The fourth transmitting unit may transmit to the content reproduction apparatus a request for a list of reproducible content and a request for reproduction of content, each of the requests having the birth date information attached thereto.

When, as a result of calculation by the calculation unit of the age of the user of the information processing apparatus, the user of the information processing apparatus is a user under the age in which one is subject to parental control over parental controlled content to which parental control information is attached, the generation unit may generate a content list excluding the parental controlled content and may generate, when the user of the information processing apparatus is a user under the age in which one is not subject to parental control over certain parental controlled content of the parental controlled content, a content list only including the certain parental controlled content of the parental controlled content.

According to another embodiment of the present invention, there is provided a content reproduction method, including the steps of receiving by a content reproduction apparatus a request for a list of reproducible content, which is transmitted from an information processing apparatus, confirming by the content reproduction apparatus predetermined information attached to the received request for a content list, generating by the content reproduction apparatus a content list to be transmitted to the information processing apparatus, based on confirmation results of the predetermined information, transmitting by the content reproduction apparatus the generated content list to the information processing apparatus, receiving by the information processing apparatus a content list transmitted from the content reproduction apparatus, displaying by the information processing apparatus the received content list, and transmitting by the information processing apparatus a request for reproduction of content in the displayed content list.

According to another embodiment of the present invention, there is provided a content reproduction method, including the steps of receiving by a content reproduction apparatus a request for a list of reproducible content, which is transmitted from an information processing apparatus, calculating by the content reproduction apparatus the age of a user of the information processing apparatus, based on predetermined information attached to the received request for a content list, generating by the content reproduction apparatus a content list to be transmitted to the information processing apparatus, based on calculation results of the age of the user of the information processing apparatus, transmitting by the content reproduction apparatus the generated content list to the information processing apparatus, receiving by the information processing apparatus a content list transmitted from the content reproduction apparatus, displaying by the information processing apparatus the received content list, and transmitting by the information processing apparatus a request for reproduction of content in the displayed content list.

According to the embodiments of the present invention described above, it is possible to enhance usability for a user in content reproduction when the parental control function is enabled.

BRIEF DESCRIPTION OF THE DRAWINGS

FIG. 13 is an explanatory diagram for illustrating a transmission allowance setting for allowing transmission of any content and a transmission disallowance setting for disallowing transmission of any content.

DETAILED DESCRIPTION OF THE EMBODIMENTS

Figure 1:
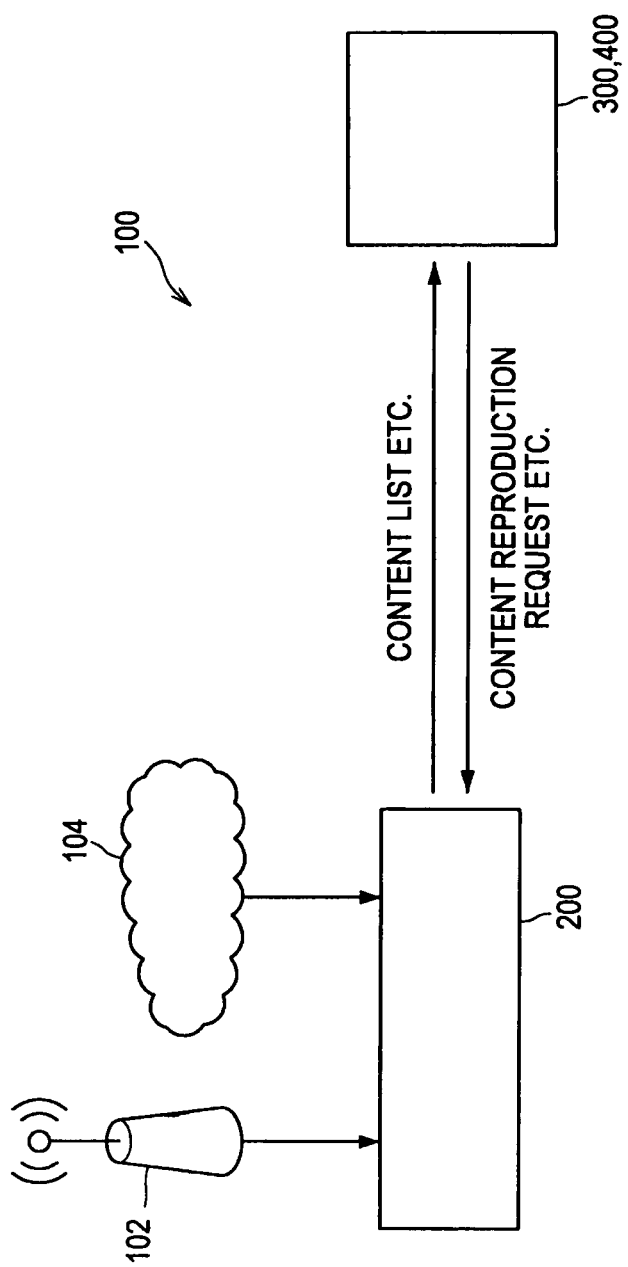
FIG. 1 is a diagram schematically showing a configuration of a content reproduction system according to a first embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

Explanation will be made in the following order.
1. Content reproduction system (first embodiment)
2. First content reproduction processing (first embodiment)
3. Second content reproduction processing (first embodiment)
4. Third content reproduction processing (first embodiment)
5. Content reproduction system (second embodiment)
6. First content reproduction processing (second embodiment)
7. Second content reproduction processing (second embodiment)
8. Content reproduction system (third embodiment)
9. Content reproduction processing (third embodiment)

[1. Content Reproduction System (First Embodiment)]

First, a content reproduction system according to a first embodiment of the present invention will be explained. FIG. 1 is a diagram schematically showing a configuration of the content reproduction system according to the first embodiment of the present invention.

In FIG. 1, a content reproduction system 100 includes a content reproduction apparatus 200 that reproduces content such as a broadcast program and a DVD, and information processing apparatus 300, 400 such as a cell phone. The content reproduction apparatus 200 is equipped with a parental control function, referred as to a parental lock, by which a parent restricts content that his/her child may watch, for example, in order to make it impossible for his/her child to freely watch an x-rated program or the like. In the present embodiment, the information processing apparatus 300 is an information processing apparatus owned by a user such as a child, who is subject to parental control over content, such as an x-rated program, to which parental control information is attached by a broadcaster or the like (hereafter, referred as to "parental controlled content"). The information processing apparatus 400 is an information processing apparatus owned by a user such as a parent, who is not subject to parental control over parental controlled content.

The content reproduction apparatus 200 receives content such as a broadcast program from a broadcasting station 102. Also, the content reproduction apparatus 200 receives content such as a broadcasting program via the Internet 104. Besides, parental control information is attached by a broadcaster or the like to content such as an x-rated program, which a parent do not probably want his/her child to watch, of the content received from the broadcasting station 102 or via the Internet 104.

The information apparatus 300, 400 may receive, by requesting a list of reproducible content (hereafter, simply referred as to a "content list") from the content reproduction apparatus 200, a content list from the content reproduction apparatus 200. Further, the information processing apparatus 300, 400 display the received content list. And when the information processing apparatus 300 or 400 is instructed by a user to reproduce content in the content list, the information processing apparatus 300 or 400 may request the content reproduction apparatus 200 to reproduce the corresponding content.

Figure 2:
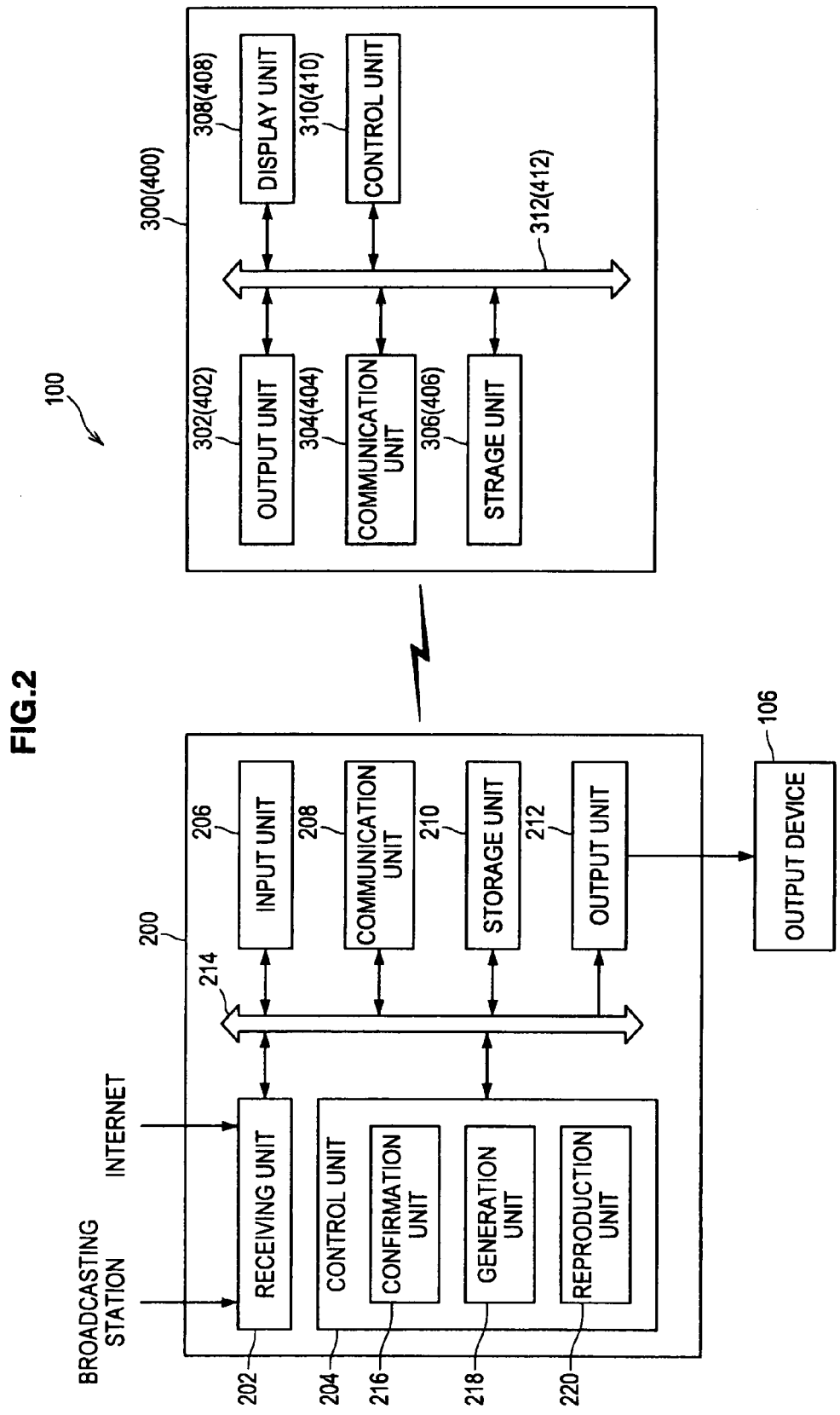
FIG. 2 is a block diagram schematically showing a configuration of a content reproduction apparatus and of information processing apparatus in the content reproduction system of FIG. 1.

FIG. 2 is a block diagram schematically showing a configuration of a content reproduction apparatus 200 and of information processing apparatus 300, 400 in the content reproduction system 100 of FIG. 1.

In FIG. 2, the content reproduction apparatus 200 includes a receiving unit 202, a control unit 204, an input unit 206, a communication unit 208, a storage unit 210, and output unit 212, and also includes a bus 214, to which the receiving unit 202, the control unit 204, the input unit 206, the communication unit 208, the storage unit 210, and output unit 212 are connected.

The receiving unit 202 receives content such as a broadcast program from a broadcasting station. Further, the receiving unit 202 receives content such as a broadcast program via the Internet.

The control unit 204 performs control over each unit of the content reproduction apparatus 202. Further, the control unit 204 includes a confirmation unit 216, a generation unit 218 and a reproduction unit 220. When later-described passcode information is attached to a request for a content list or a request for reproduction of content, which has been received from the information processing apparatus 300 or 400, the confirmation unit 216 performs verification of a passcode based on the passcode information. Further, when later-described setting information of display allowance setting for allowing display of a content list including parental control content or display disallowance setting for disallowing display of a content list including parental controlled content is attached to a request for a content list or a request for reproduction of content, which has been received from the information processing apparatus 300 or 400, the confirmation unit 216 performs confirmation of the setting information. Furthermore, when later-described device information is attached to a request for a content list or a request for reproduction of content, which has been received from the information processing apparatus 300 or 400, the confirmation unit 216 performs confirmation of the device information. The generation unit 218 generates a content list excluding parental controlled content of reproducible content or a content list including parental controlled content of reproducible content. The reproduction unit 220 reproduces content for which an instruction for reproduction is given.

The input unit 206 accepts operation input of a user. For example, the input unit 206 accepts input of a passcode for enabling or disenabling the parental lock function.

The communication unit 208 is an example of a first receiving unit or a first transmitting unit of the present invention, and receives a request for a content list or a request for reproduction of content, which has been received from the information processing apparatus 300 or 400. Also, the communication unit 208 transmits to the information processing apparatus 300 or 400 a content list generated by the generation unit 218.

When an instruction for content such as a broadcast program, received by the receiving unit 202, to be recorded is given, the storage unit 210 stores the corresponding content. Further, when storing parental controlled content, the storage unit 210 stores parental controlled content, after associating the parental controlled content with parental control information.

The output unit 212 outputs to an output device 106 the content reproduced by the reproduction unit 220. The output device 106 performs video or audio output of content which has been input.

On the other hand, the information processing apparatus 300 (400) includes an input unit 302 (402), a communication unit 304 (404), a storage unit 306 (406), a display unit 308 (408), and a control unit 310 (410), and also includes a bus 312 (412), to which the input unit 302 (402), the communication unit 304 (404), the storage unit 306 (406), the display unit 308 (408), and the control unit 310 (410) are connected.

The input unit 302 (402) accepts operation input of a user. For example, the input unit 302 (402) accepts input by a user of a passcode or an instruction for a content list to be displayed.

The communication unit 304 (404) is an example of a second receiving unit or a second transmitting unit of the present invention, and receives a content list transmitted from the content reproduction apparatus 200. Further, the communication unit 304 (404) transmits to the content reproduction apparatus 200 a request for a content list or a request for reproduction of content.

The storage unit 306 (406) stores setting information of display allowance setting for allowing display of a content list including parental controlled content or display disallowance setting for disallowing display of a content list including parental controlled content, which will be described later.

The display unit 308 (408) displays a content list received from the content reproduction apparatus 200. The control unit 310 (410) performs control over each unit of the information processing apparatus 300 (400).

[2. First Content Reproduction Processing (First Embodiment)]

Figure 3:
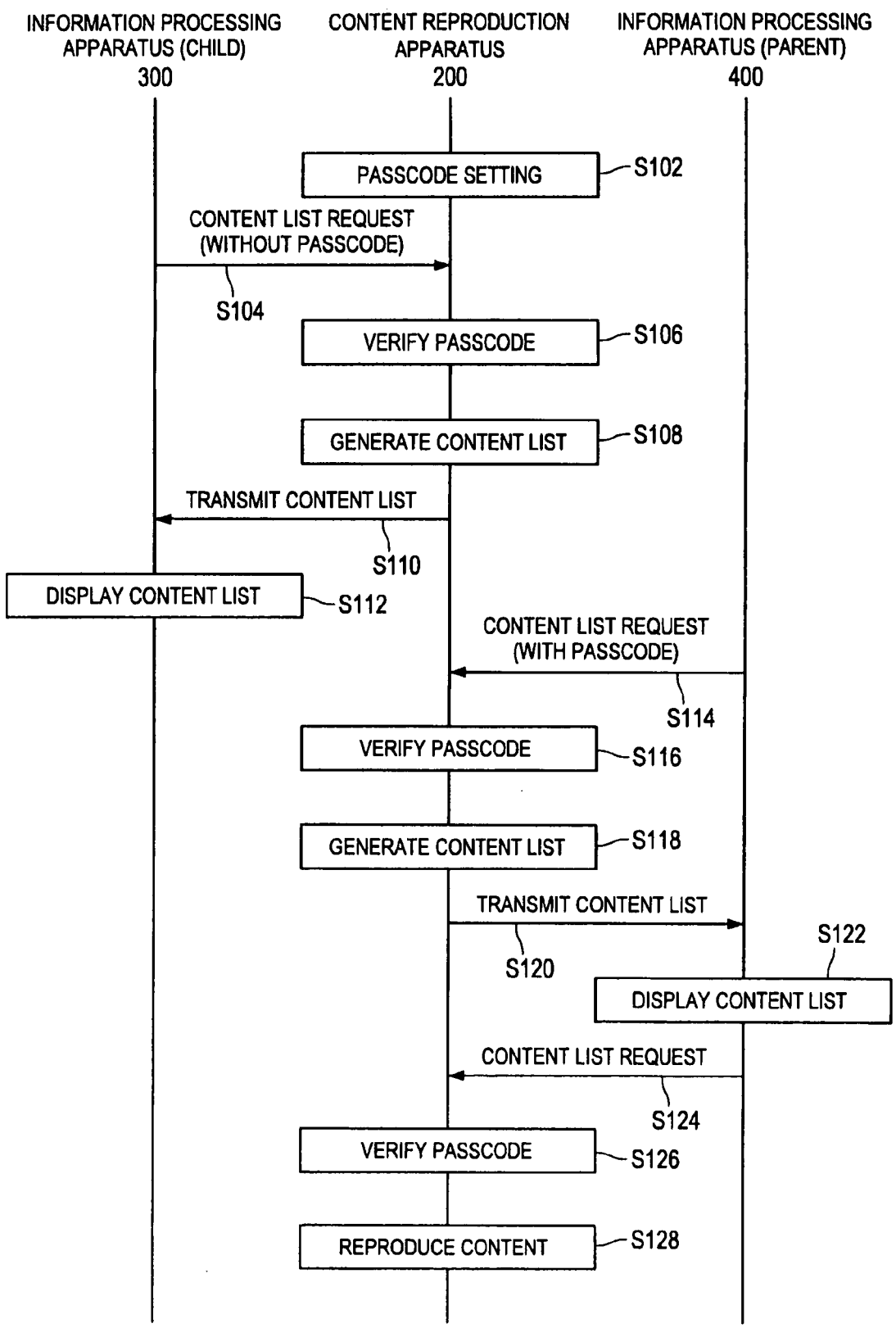
FIG. 3 is a sequence diagram of first content reproduction processing that is performed by the content reproduction apparatus and the information processing apparatus in the content reproduction system of FIG. 1.

Next, first content reproduction processing that is performed by the content reproduction apparatus 200 and the information processing apparatus 300,400 in the content reproduction system 100 of FIG. 1 will be explained. FIG. 3 is a sequence diagram of the first content reproduction processing that is performed by the content reproduction apparatus 200 and the information processing apparatus 300, 400 in the content reproduction system 100 of FIG. 1. Besides, in the present processing, the parental lock function of the content reproduction apparatus 200 is enabled in advance.

In FIG. 3, first, the content reproduction apparatus 200 accepts setting of a passcode from an administrator, such as a parent, of the content reproduction apparatus 200 via, for example, the input unit 206 (step S102). Besides, in the present embodiment, setting of a passcode is performed at the step S102, but it is also possible to use a passcode for enabling or disenabling the parental lock function instead, without performing setting of a passcode.

Subsequently, the information processing apparatus 300 owned by a user such as a child, who is subject to parental control over parental controlled content, transmits a request for a content list via the communication unit 304 to the content reproduction apparatus 200, when the information processing apparatus 300 is instructed by the user via, for example, the input unit 302 to display a content list (step S104). Besides, the user, such as a child, of the information processing apparatus 300 does not know the passcode which has been set at the step S102. Accordingly, passcode information is not attached to the request for a content list transmitted at the step S104.

Subsequently, when the content reproduction apparatus 200 receives a request for a content list via the communication unit 208 from the information processing apparatus 300, the confirmation unit 216 performs verification of a passcode based on passcode information attached to the received request for a content list (step S106). Besides, passcode information is not attached to the request for a content list transmitted at the step S104, and verification of a passcode is therefore not performed at the step S106.

Subsequently, because the content reproduction apparatus 200 could not perform verification of a passcode at the step S106, the generation unit 218 generates a content list excluding parental controlled content of reproducible content (step S108).

Subsequently, the content reproduction apparatus 200 transmits the content list excluding parental controlled content, which was generated at the step S108, via the communication unit 208 to the information processing apparatus 300 (step S110).

Figure 6:
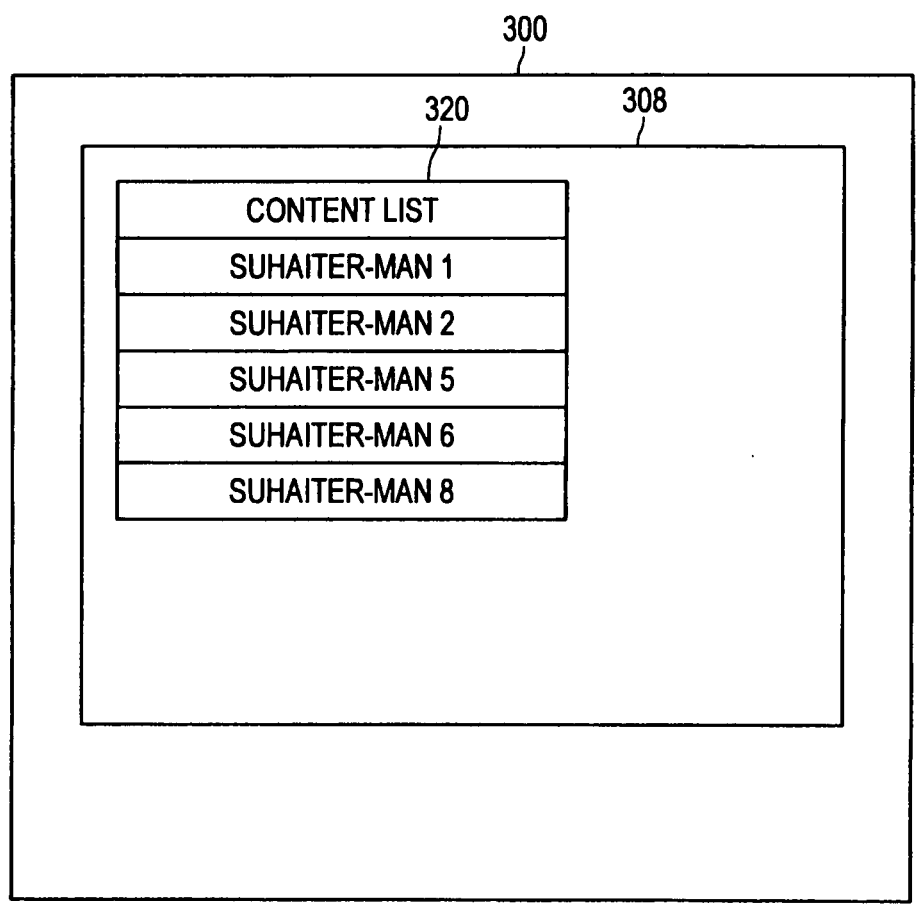
FIG. 6 is an explanatory diagram for illustrating a content list displayed on a display unit of an information processing apparatus owned by a user who is subject to parental control over parental controlled content.

Subsequently, when the information processing apparatus 300 receives the content list via the communication unit 304 from the content reproduction apparatus 200, the display unit 308 displays the received content list (step S112). For example, at the step S112, the display unit 308 of the information processing apparatus 300 displays a content list 320 as shown in FIG. 6.

On the other hand, the information processing apparatus 400 owned by a user such as a parent, who is not subject to parental control over parental controlled content, transmits to the content reproduction apparatus 200 via the communication unit 404 a request for a content list, to which the passcode information is attached, when the information processing apparatus 400 is instructed by the user via, for example, the input unit 402 to display a content list and when the passcode set at the step S102 is input (step S114). Besides, the information processing apparatus 404 may store the passcode having been input at the step S114 in the storage unit 406.

Subsequently, when the content reproduction apparatus 200 receives, from the information processing apparatus 400 via the communication unit 208, the request for a content list, to which the passcode information is attached, the confirmation unit 216 performs verification of a passcode based on the passcode information attached to the received request for a content list (step S116). Besides, verification of a passcode may be performed at the step S116, because the passcode information is attached to the request for a content list transmitted at the step S114.

Subsequently, when the content reproduction apparatus 200 could verify the passcode at the step S116, the generation unit 218 generates a content list including parental controlled content of reproducible content (step S118). Moreover, when the passcode can not be verified at the step S116, the content reproduction apparatus 200 performs the same processing as when the content reproduction apparatus 200 received the request for a content list at the step S104. Namely, the generation unit 218 generates a content list excluding parental controlled content of reproducible content.

Subsequently, the content reproduction apparatus 200 transmits, via the communication unit 208 to the information processing apparatus 400, the content list including parental controlled content, which was generated at the step S118 (step S120).

Figure 7:
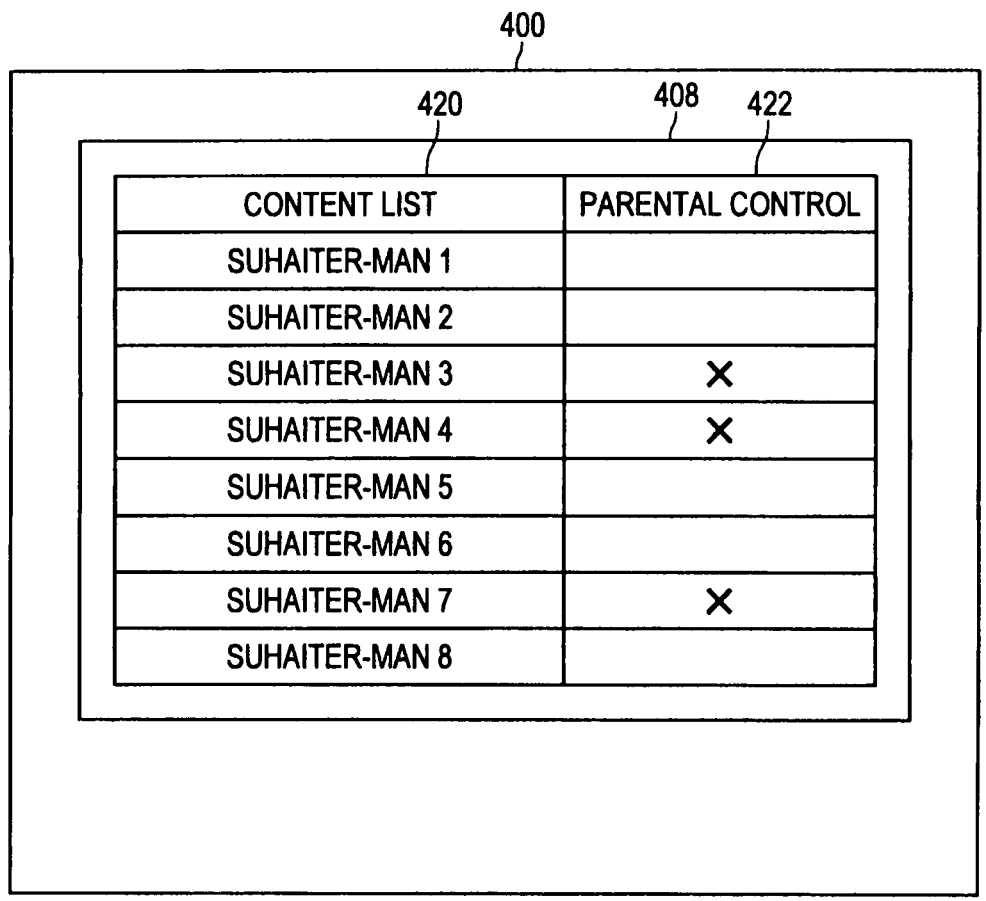
FIG. 7 is an explanatory diagram for illustrating a content list displayed on a display unit of an information processing apparatus owned by a user who is not subject to parental control over parental controlled content.

Subsequently, when the information processing apparatus 400 receives the content list from the content reproduction apparatus 200 via the communication unit 404, the display unit 408 displays the received content list (step S122). For example, at the step 122, as shown in FIG. 7, the display unit 408 of the information processing apparatus 400 displays a content list 420 and parental control 422 for clearly showing parental controlled content. A user may recognize that "SUHAITER-MAN 3, 4, 7" in the content list 420 are parental controlled content, by checking the parental control 422.

Subsequently, when the information processing apparatus 400 is instructed by a user via, for example, the input unit 402 to reproduce content in the content list displayed at the step 122 and when a passcode having been set at the step S102 is input, the information processing apparatus 400 transmits, to the content reproduction apparatus 200 via the communication unit 404, a request for reproduction of content for which the instruction for reproduction is given, the request having passcode information attached thereto (step S124). Besides, the request for reproduction, transmitted at the step S124, of content for which the instruction for reproduction is given has identification information of the corresponding content attached thereto.

Subsequently, when the content reproduction apparatus 200 receives, from the information processing apparatus 400 via the communication unit 208, the request for reproduction of content for which the instruction for reproduction is given, the request having the passcode information attached thereto, the confirmation unit 216 performs verification of a passcode based on the passcode information attached to the request for reproduction of content for which the instruction for reproduction is given (step S126).

Subsequently, when the content reproduction apparatus 200 could verify the passcode at the step S126, the reproduction unit 220 reproduces the content for which the instruction for reproduction is given, and the output unit 212 outputs to the output device 106 the content reproduced by the reproduction unit 220 (step S128).

According to the first content reproduction processing of FIG. 3, a content list excluding parental controlled content of reproducible content is displayed on the information processing apparatus 300 owned by a user such as a child, who is subject to parental control over parental controlled content. Also, a content list including parental controlled content of reproducible content is displayed on the information processing apparatus 400 owned by a user such as a parent, who is not subject to parental control over parental controlled content. Accordingly, when a user such as a parent, who is not subject to parental control over parental controlled content, wants to give an instruction for parental controlled content to be reproduced, the parental lock function of the content reproduction apparatus 200 does not need to be disenabled. Thereby, it is possible to enhance usability for a user in content reproduction when the parental lock function of the content reproduction apparatus 200 is enabled.

[3. Second Content Reproduction Processing (First Embodiment)]

Figure 4:
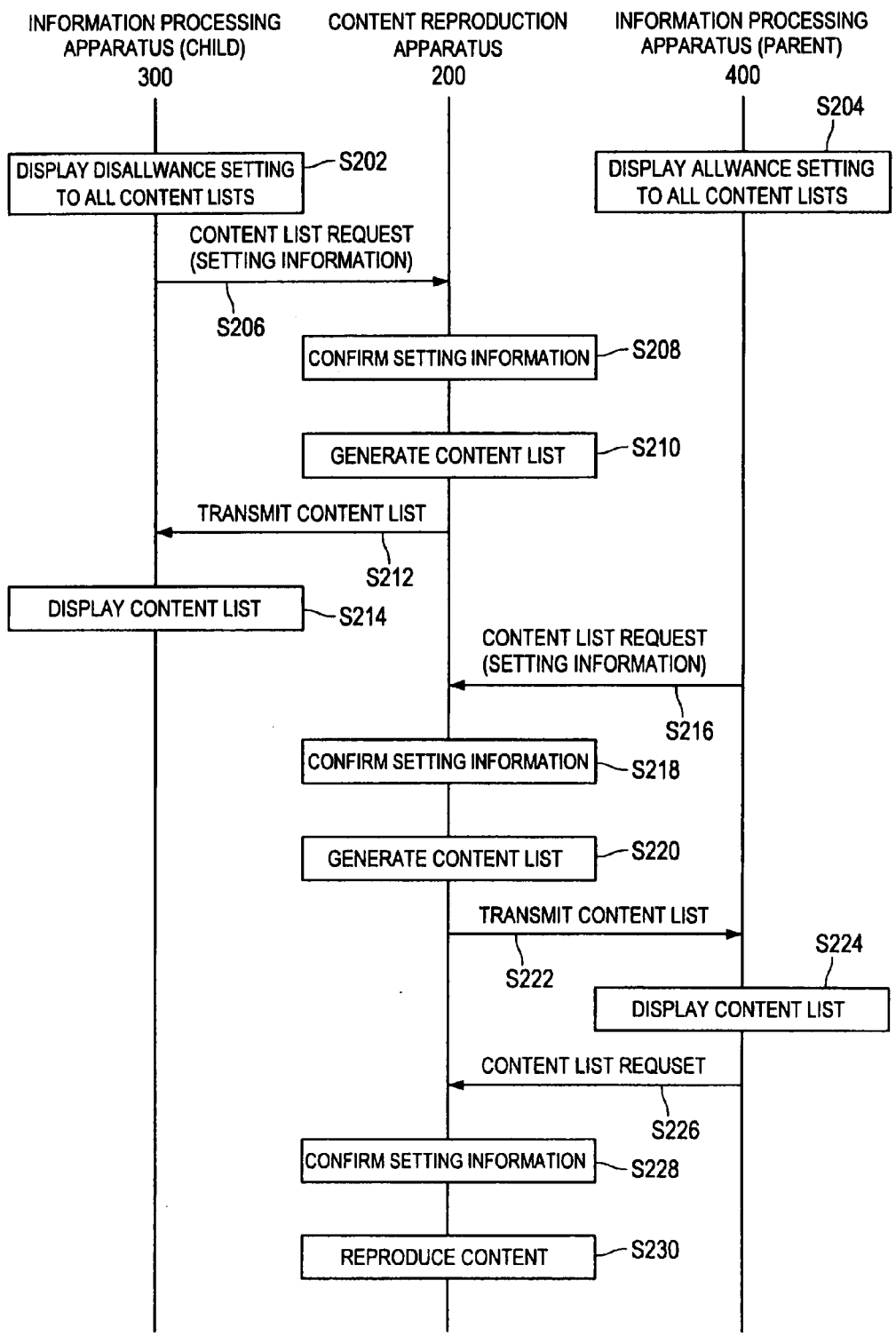
FIG. 4 is a sequence diagram of second content reproduction processing that is performed by the content reproduction apparatus and the information processing apparatus in the content reproduction system of FIG. 1.

Next, second content reproduction processing that is performed by the content reproduction apparatus 200 and the information processing apparatus 300,400 in the content reproduction system 100 of FIG. 1 will be explained. FIG. 4 is a sequence diagram of the second content reproduction processing that is performed by the content reproduction apparatus 200 and the information processing apparatus 300, 400 in the content reproduction system 100 of FIG. 1. Besides, in the present processing, the parental lock function of the content reproduction apparatus 200 is enabled in advance.

In FIG. 4, first, the information apparatus 300 owned by a user such as a child, who is subject to parental control over parental controlled content, accepts display disallowance setting for disallowing display of a content list including all reproducible content, that is, a content list including parental controlled content, from an administrator, such as a parent, of the content reproduction apparatus 200 via, for example, the input unit 302 (step S202). Besides, when a cell phone serves as the information processing apparatus 300, it may be that a parent embeds the display disallowance setting, which is set at the step S202, in a cell phone of his/her child, because the parent usually signs up for a cell phone service of his/her child.

On the other hand, the information processing apparatus 400 owned by a user such as a parent, who is not subject to parental control of parental controlled content, accepts display allowance setting for allowing display of a content list including all reproducible content, that is, a content list including parental controlled content, from an administrator, such as a parent, of the content reproduction apparatus 200 via, for example, the input unit 402 (step S204).

Then, when the information processing apparatus 300 is instructed by a user via, for example, the input unit 302 to display a content list, the information processing apparatus 300 transmits, to the content reproduction apparatus 200 via the communication unit 304, a request for a content list, to which the setting information of display disallowance setting accepted at the step S202 is attached (step S206).

Subsequently, when the content reproduction apparatus 200 receives the request for a content list from the information processing apparatus 300 via, for example, the communication unit 208, the confirmation unit 216 performs confirmation of the setting information attached to the received request for a content list (step S208).

Subsequently, because the content reproduction apparatus 200 has performed confirmation of the setting information of display disallowance setting at the step S208, the generation unit 218 generates a content list excluding parental controlled content of reproducible content (step S210).

Subsequently, the content reproduction apparatus 200 transmits, to the information processing apparatus 300 via the communication unit 208, the content list excluding parental controlled content, which was generated at the step S210 (step S212).

Subsequently, when the information processing apparatus 300 receives the content list from the content reproduction apparatus 200 via the communication unit 304, the display unit 308 displays the received content list (step S214).

On the other hand, when the information processing apparatus 400 is instructed by a user via, for example, the input unit 402 to display a content list, the information processing apparatus 400 transmits, to the content reproduction apparatus 200 via the communication unit 404, a request for a content list, to which the setting information of display allowance setting accepted at the step S204 is attached (step S216).

Subsequently, when the content reproduction apparatus 200 receives the request for a content list from the information processing apparatus 400 via the communication unit 208, the confirmation unit 216 performs confirmation of the setting information attached to the received request for a content list (step S218).

Subsequently, because the content reproduction apparatus 200 has performed confirmation of the setting information of display allowance setting at the step S218, the generation unit 218 generates a content list including parental controlled content of reproducible content (step S220).

Subsequently, the content reproduction apparatus 200 transmits, to the information processing apparatus 400 via the communication 208, the content list including parental controlled content, which was generated at the step 220 (step S222).

Subsequently, when the information processing apparatus 400 receives the content list from the content reproduction apparatus 200 via the communication unit 404, the display unit 408 displays the received content list (step S224).

Subsequently, when the information processing apparatus 400 is instructed by a user via, for example, the input unit 402 to reproduce content in the content list displayed at step S224, the information processing apparatus 400 transmits, to the content reproduction apparatus 200 via the communication unit 404, a request for reproduction of content for which the instruction for reproduction is given, the request having the setting information of display allowance setting accepted at the step S204 attached thereto (step S226). Besides, the request for reproduction, transmitted at the step S226, of content for which the instruction for reproduction is given has identification information of the corresponding content attached thereto.

Subsequently, when the content reproduction apparatus 200 receives, from the information processing apparatus 400 via the communication unit 208, the request for reproduction of content for which the instruction for reproduction is given, the request having the setting information attached thereto, the confirmation unit 216 performs confirmation of the setting information attached to the request for reproduction of the content for which the instruction for reproduction is given (step S228).

Subsequently, because the content reproduction apparatus 200 has performed confirmation of the setting information of display allowance setting at the step S228, the reproduction unit 220 reproduces the content for which the instruction for reproduction is given, and the output unit 212 outputs to the output device 106 the content reproduced by the reproduction unit 220 (step S230).

According to the second content reproduction processing of FIG. 4, a content list excluding parental controlled content of reproducible content is displayed on the information processing apparatus 300 owned by a user such as a child, who is subject to parental control over parental controlled content. And a content list including parental controlled content of reproducible content is displayed on the information processing apparatus 400 owned by a user such as a parent, who is not subject to parental control over parental controlled content. Thereby, the same effect as in the first content reproduction processing of FIG. 3 as described above may be achieved.

[4. Third Content Reproduction Processing (First Embodiment)]

Figure 5:
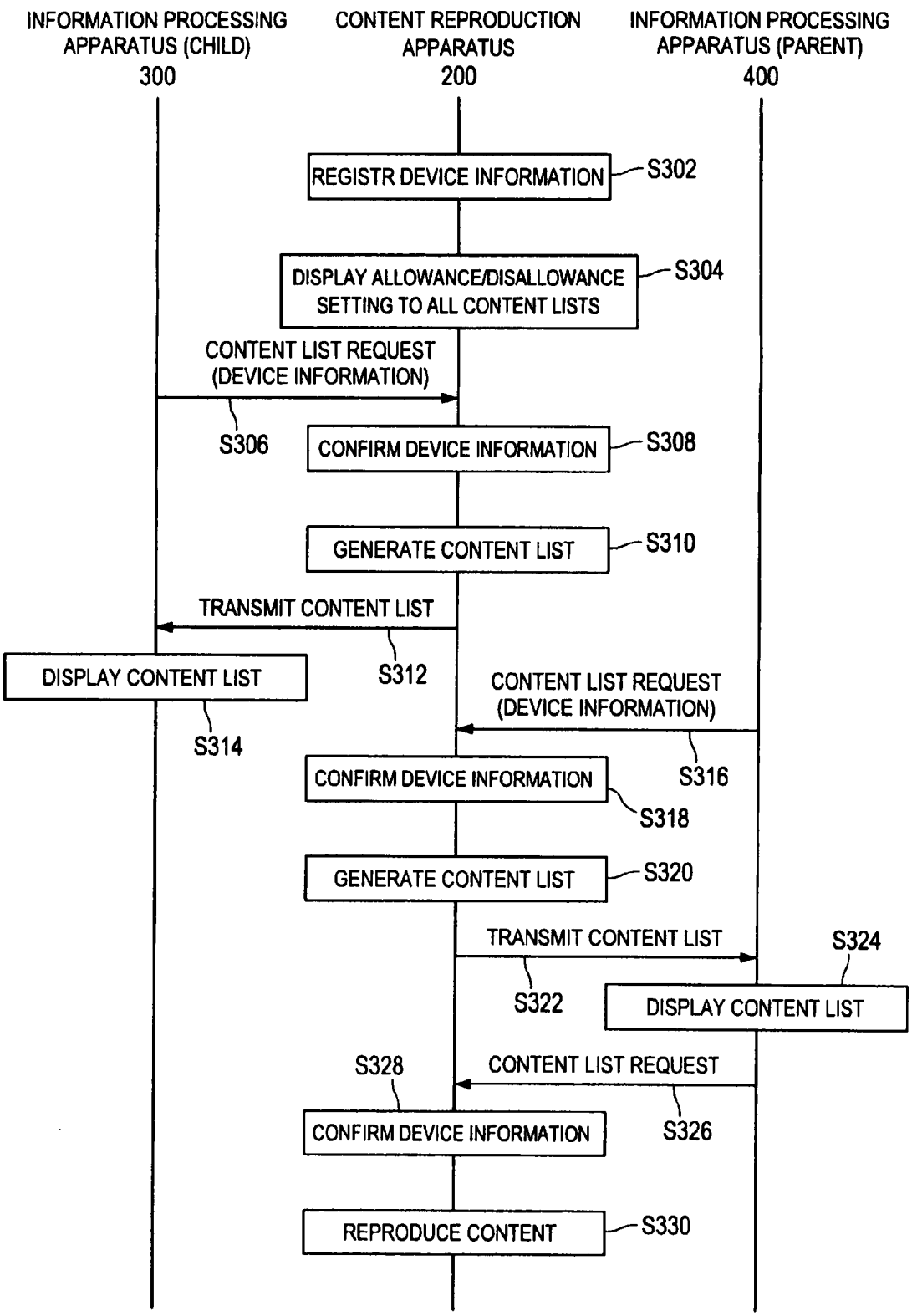
FIG. 5 is a sequence diagram of third content reproduction processing that is performed by the content reproduction apparatus and the information processing apparatus in the content reproduction system of FIG. 1.

Next, third content reproduction processing that is performed by the content reproduction apparatus 200 and the information processing apparatus 300, 400 in the content reproduction system 100 of FIG. 1 will be explained. FIG. 5 is a sequence diagram of the third content reproduction processing that is performed by the content reproduction apparatus 200 and the information processing apparatus 300, 400 in the content reproduction system 100 of FIG. 1. Besides, in the present processing, the parental lock function of the content reproduction apparatus 200 is enabled in advance.

In FIG. 5, first, the content reproduction apparatus 200 accepts from an administrator, such as a parent, of the content reproduction apparatus 200 via, for example, the input unit 206 registration of device information of the information processing apparatus 300 owned by a user such as a child, who is subject to parental control over parental controlled content, or of the information processing apparatus 400 owned by a user such as a parent, who is not subject to parental control over parental controlled content (step S302).

Subsequently, the content reproduction apparatus 200 accepts from an administrator, such as a parent, of the content reproduction apparatus 200 via, for example, the input unit 206, display disallowance setting for disallowing display of a content list including all reproducible content, that is, for disallowing display of a content list including parental controlled content, with regard to the device information of the information processing apparatus 300, which was registered at the step S302. Further, the content reproduction apparatus 200 accepts from an administrator, such as a parent, of the content reproduction apparatus 200 via, for example, the input unit 206, display allowance setting for allowing display of a content list including all reproducible content, that is, for allowing display of a content list including parental controlled content, with regard to the device information of the information processing apparatus 400, which was registered at the step S302 (step S304).

Subsequently, when the information processing apparatus 300 is instructed by a user via, for example, the input unit 302 to display a content list, the information processing apparatus 300 transmits, to the content reproduction apparatus 200 via the communication unit 304, a request for a content list, to which the device information of the information processing apparatus 300 is attached (step S306).

Subsequently, when the content reproduction apparatus 200 receives the request for a content list from the information processing apparatus 300 via the communication unit 208, the confirmation unit 216 performs confirmation of the device information attached to the received request for a content list (step S308).

Subsequently, the content reproduction apparatus 200 performs confirmation of the device information of the information processing apparatus 300 at the step S308. Because display disallowance setting has been set to the device information of the information processing apparatus 300 at the step S304, the generation unit 218 generates a content list excluding parental controlled content of reproducible content (step S310).

Subsequently, the content reproduction apparatus 200 transmits, to the information processing apparatus 300 via the communication unit 208, the content list excluding parental controlled content, which was generated at the step S310 (step S312).

Subsequently, when the information processing apparatus 300 receives the content list from the content reproduction apparatus 200 via the communication unit 304, the display unit 308 displays the received content list (step S314).

On the other hand, when the information processing apparatus 400 is instructed by a user via, for example, the input unit 402 to display a content list, the information processing apparatus 400 transmits, to the content reproduction apparatus 200 via the communication unit 404, a request for a content list, to which the device information of the information processing apparatus 400 is attached (step S316).

Subsequently, when the content reproduction apparatus 200 receives the request for a content list from the information processing apparatus 400 via the communication unit 208, the confirmation unit 216 performs confirmation of the device information attached to the received request for a content list (step S318).

Subsequently, the content reproduction apparatus 200 has performs confirmation of the device information of the information processing apparatus 400 at the step 318. And because the display allowance setting has been set to the device information of the information processing apparatus 400 at the step 304, the generation unit 218 generates a content list including parental controlled content of reproducible content (step S320).

Subsequently, the content reproduction apparatus 200 transmits, to the information processing apparatus 400 via the communication unit 208, the content list including parental controlled content, which was generated at the step S320 (step S322).

Subsequently, when the information processing apparatus 400 receives the content list from the content reproduction apparatus 200 via the communication unit 404, the display unit 408 displays the received content list (step S324).

Subsequently, when the information processing apparatus 400 is instructed by a user via, for example, the input unit 402 to reproduce content in the content list displayed at the step S324, the information processing apparatus 400 transmits, to the content reproduction apparatus 200 via the communication unit 404, a request for reproduction of content for which the instruction for reproduction is given, the request having the device information of the information processing apparatus 400 attached thereto (step S326). Besides, the request for reproduction, transmitted at the step S326, of content for which the instruction for reproduction is given has identification information of the corresponding content attached thereto.

Subsequently, when the information processing apparatus 200 receives, from the information processing apparatus 400 via the communication unit 208, the request for reproduction of content for which the instruction for reproduction is given, the request having the device information of the information processing apparatus 400 attached thereto, the confirmation unit 216 performs confirmation of the device information attached to the request for reproduction of the content for which the instruction for reproduction is given (step S328).

Subsequently, because the content reproduction apparatus 200 has performed confirmation of the device information of the information processing apparatus 400 at the step 328, the reproduction unit 220 reproduces the content for which the instruction for reproduction is given, and the output unit 212 outputs to the output device 106 the content reproduced by the reproduction unit 220 (step S330).

According to the third content reproduction processing of FIG. 5, a content list excluding parental controlled content of reproducible content is displayed on the information processing apparatus 300 owned by a user such as a child, who is subject to parental control over parental controlled content. And a content list including parental controlled content of reproducible content is displayed on the information processing apparatus 400 owned by a user such as a parent, who is not subject to parental control over parental controlled content. Thereby, the same effect as in the first content reproduction processing of FIG. 3 as described above may be achieved.

[5. Content Reproduction System (Second Embodiment)]

Figure 8:
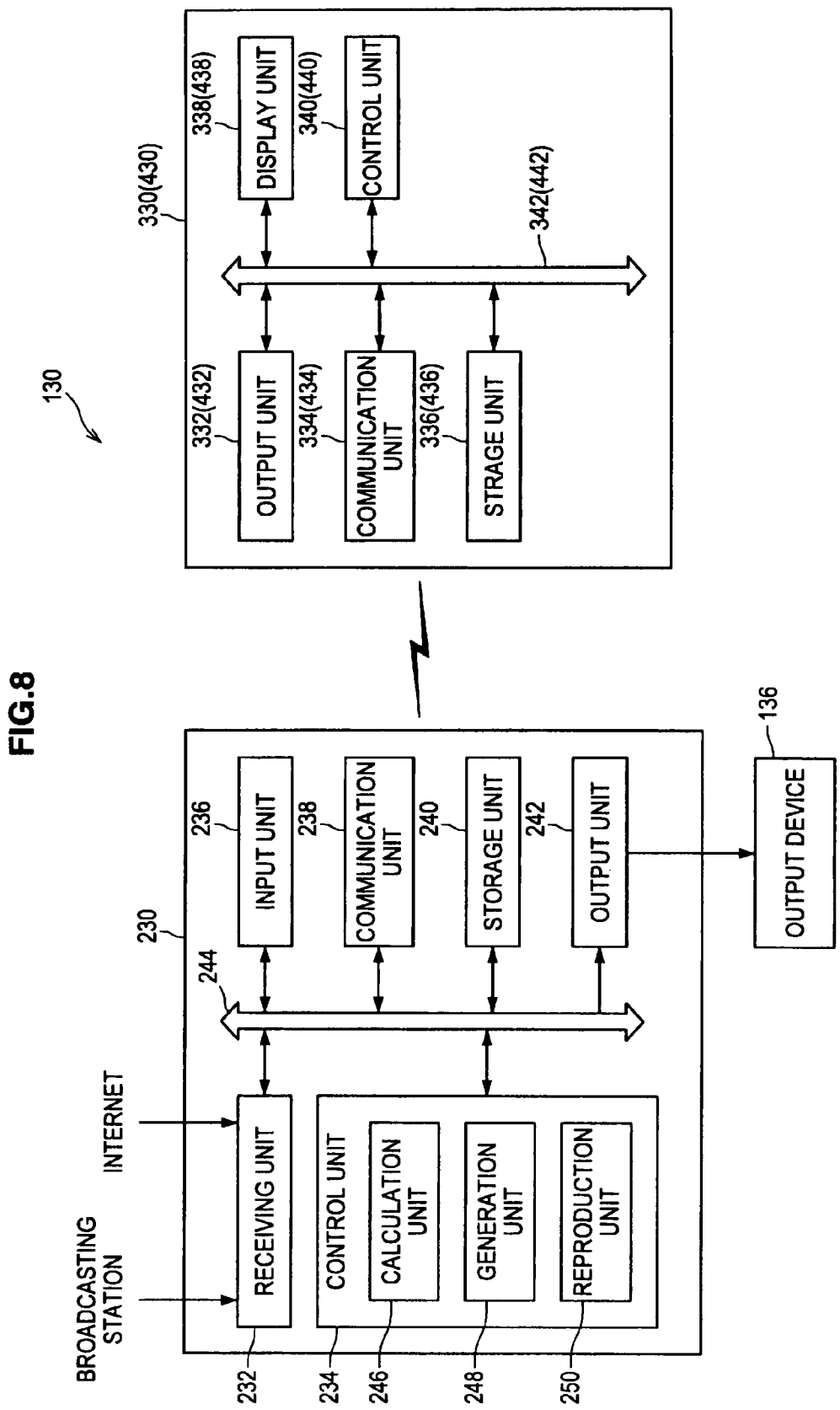
FIG. 8 is a block diagram schematically showing a configuration of a content reproduction apparatus and of information processing apparatus in a content reproduction system according to a second embodiment of the present invention.

Next, a content reproduction system according to a second embodiment of the present invention will be explained. FIG. 8 is a block diagram schematically showing a configuration of a content reproduction apparatus and of information processing apparatus in the content reproduction system according to the second embodiment of the present invention.

In FIG. 8, the content reproduction system 130 includes a content reproduction apparatus 230 that reproduces content such as a broadcast program and a DVD, and information processing apparatus 330, 430 such as a cell phone. The content reproduction apparatus 230 is equipped with a parental control function, referred as to a parental lock, by which a parent restricts content that his/her child may watch, for example, in order to make it impossible for his/her child to freely watch an x-rated program or the like. In the present embodiment, the information processing apparatus 330 is an information processing apparatus owned by a user such as a younger brother as a child 1, who is subject to parental control over content to which parental control information is attached by a broadcaster or the like (hereafter, referred as to "parental controlled content"). The information processing apparatus 430 is an information processing apparatus owned by a user such as an elder brother as a child 2, who is not subject to parental control over certain parental controlled content of parental controlled content.

The content reproduction system 230 receives content such as a broadcast program from a broadcasting station. Also, the content reproduction apparatus 230 receives content such as a broadcasting program via the Internet. Besides, parental control information is attached by a broadcaster or the like to content such as an x-rated program, which a parent does not probably want his/her child to watch, of the content received from a broadcasting station or via the Internet. Further, the parental control information includes age information, and a broadcaster or the like restricts viewing of the parental controlled content by a user who does not reach an age in the age information.

The information apparatus 330, 430 may receive, by requesting a list of reproducible content (hereafter, simply referred as to a "content list") from the content reproduction apparatus 230, a content list from the content reproduction apparatus 230. Further, the information processing apparatus 330, 430 display the received content list. And when the information processing apparatus 330 or 430 is instructed by a user to reproduce content in the content list, the information processing apparatus 330 or 430 may request the content reproduction apparatus 230 to reproduce the corresponding content.

Further, the content reproduction apparatus 230 includes a receiving unit 232, a control unit 234, an input unit 236, a communication unit 238, a storage unit 240, and an output unit 242, and also includes a bus 244, to which the receiving unit 232, the control unit 234, the input unit 236, the communication unit 238, the storage unit 240, and the output unit 242 are connected.

The receiving unit 232 receives content such as a broadcast program from a broadcasting station. Further, the receiving unit 232 receives content such as a broadcast program via the Internet.

The control unit 234 performs control over each unit of the content reproduction apparatus 230. Further, the control unit 234 includes a calculation unit 246, a generation unit 248 and a reproduction unit 250. When later-described setting information of birth day setting is attached to a request for a content list or a request for reproduction of content, which has been received from the information processing apparatus 330 or 430, the calculation unit 246 calculates the age of a user based on the setting information. Further when later-described device information is attached to a request for a content list or a request for reproduction of content, which has been received from the information processing apparatus 330 or 430, the calculation unit 246 calculates the age of a user based on setting information of birth date setting, which has been set to the device information. The generation unit 248 generates a content list excluding parental controlled content of reproducible content or a content list only including certain parental controlled content of parental controlled content. The reproduction unit 250 reproduces content for which an instruction for reproduction is given.

The input unit 236 accepts operation input of a user. For example, the input unit 236 accepts input of a passcode for enabling or disenabling the parental lock function.

The communication unit 238 is an example of a third receiving unit or a third transmitting unit of the present invention, and receives a request for a content list or a request for reproduction of content, which has been received from the information processing apparatus 330 or 430. Also, the communication unit 238 transmits to the information processing apparatus 330 or 430 a content list generated by the generation unit 248.

When an instruction for content such as a broadcast program, received by the receiving unit 232, to be recorded is given, the storage unit 240 stores the corresponding content. Further, when storing parental controlled content, the storage unit 240 stores parental controlled content, after associating the parental controlled content with parental control information.

The output unit 242 outputs to an output device 136 the content reproduced by the reproduction unit 250. The output device 136 performs video or audio output of content which has been input.

On the other hand, the information processing apparatus 330 (430) includes an input unit 332 (432), a communication unit 334 (434), a storage unit 336 (436), a display unit 338 (438), and a control unit 340 (440), and also includes a bus 342 (442), to which the input unit 332 (432), the communication unit 334 (434), the storage unit 336 (436), the display unit 338 (438), and the control unit 340 (440) are connected.

The input unit 332 (432) accepts operation input of a user. For example, the input unit 332 (432) accepts a user instruction for a content list to be displayed.

The communication unit 334 (434) is an example of a fourth receiving unit or a fourth transmitting unit of the present invention, and receives a content list transmitted from the content reproduction apparatus 230. Further, the communication unit 334 (434) transmits to the content reproduction apparatus 230 a request for a content list or a request for reproduction of content.

The storage unit 336 (436) stores setting information of birth date setting of a user, which will be described later. The display unit 338 (438) displays a content list received from the content reproduction apparatus 230. The control unit 340 (440) performs control over each unit of the information processing apparatus 330 (430).

[6. First Content Reproduction Processing (Second Embodiment)]

Figure 9:
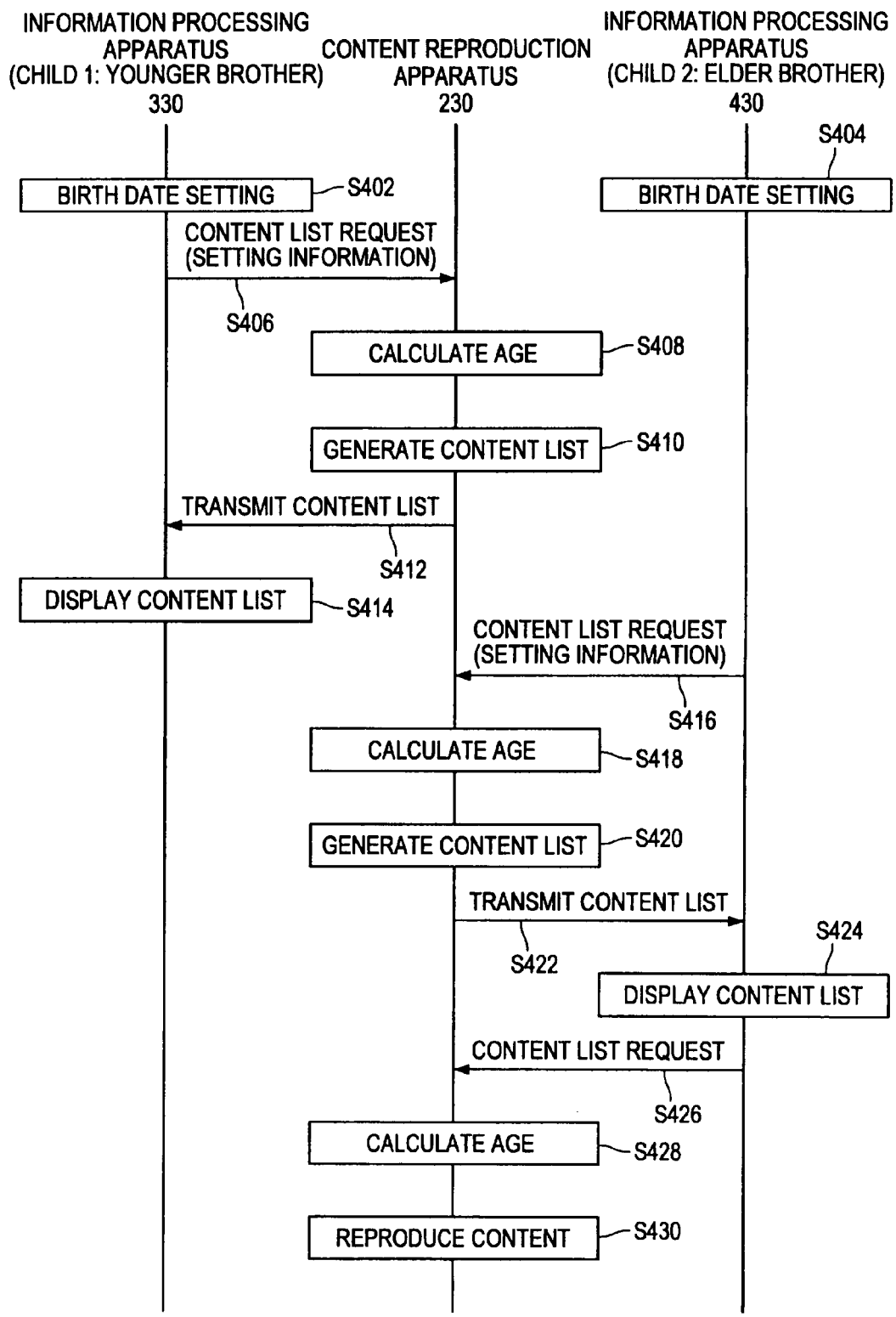
FIG. 9 is a sequence diagram of first content reproduction processing that is performed by the content reproduction apparatus and the information processing apparatus in the content reproduction system of FIG. 8.

Next, first content reproduction processing that is performed by the content reproduction apparatus 230 and the information processing apparatus 330, 430 in the content reproduction system 130 of FIG. 8 will be explained. FIG. 9 is a sequence diagram of the first content reproduction processing that is performed by the content reproduction apparatus 230 and the information processing apparatus 330, 430 in the content reproduction system 130 of FIG. 8. Besides, in the present processing, the parental lock function of the content reproduction apparatus 230 is enabled in advance.

In FIG. 9, first, the information processing apparatus 330 owned by a user such as a younger brother as a child 1, who is subject to parental control over parental controlled content, accepts birth date setting of the younger brother from an administrator, such as a parent, of the content reproduction apparatus 230 via, for example, the input unit 332 (step S402).

On the other hand, the information processing apparatus 430 owned by a user such as an elder brother as a child 2, who is not subject to parental control over certain parental controlled content, accepts birth date setting of the elder brother from an administrator, such as a parent, of the content reproduction apparatus 230 via, for example, the input unit 432 (step S404).

Then, when the information processing apparatus 330 is instructed by a user via, for example, the input unit 332 to display a content list, the information processing apparatus 330 transmits, to the content reproduction apparatus 230 via the communication unit 334, a request for a content list, to which the setting information of birth date setting accepted at the step S402 is attached (step S406).

Subsequently, when the content reproduction apparatus 230 receives the request for a content list from the information processing apparatus 330 via the communication unit 238, the calculation unit 246 calculates the age of the user of the information processing apparatus 330 based on the setting information attached to the received request for a content list (step S408).

Subsequently, because, as a result of calculation by the content reproduction apparatus 230 of the age of the user at the step S408, the user of the information processing apparatus 330 is a user under the age in which one is subject to parental control over parental controlled content, the generation unit 248 generates a content list excluding parental controlled content of reproducible content (step S410).

Subsequently, the content reproduction apparatus 230 transmits, to the information processing apparatus 330 via the communication unit 238, the content list excluding parental controlled content, which was generated at the step S410 (step S412).

Subsequently, when the information processing apparatus 330 receives the content list from the content reproduction apparatus 230 via the communication unit 334, the display unit 338 displays the received content list (step S414).

On the other hand, when the information processing apparatus 430 is instructed by a user via, for example, the input 432 to display a content list, the information processing apparatus 430 transmits, to the content reproduction apparatus 230 via the communication unit 434, a request for a content list, to which the setting information of birth date setting accepted at the step 404 is attached (step S416).

Subsequently, when the content reproduction apparatus 230 receives the request for a content list from the information processing apparatus 430 via the communication unit 238, the calculation unit 246 calculates the age of the user of the information processing apparatus 430 based on the setting information attached to the received request for a content list (step S418).

Subsequently, because, as a result of calculation by the content reproduction apparatus 230 of the age of the user at the step S418, the user of the information processing apparatus 430 is a user under the age in which one is not subject to parental control over certain parental controlled content of parental controlled content, the generation unit 248 generates a content list only including certain parental controlled content of parental controlled content (step S420).

Subsequently, the content reproduction apparatus 230 transmits, to the information processing apparatus 430 via the communication unit 238, the content list only including certain parental controlled content of parental controlled content, which was generated at the step S420 (step S422).

Subsequently, when the information processing apparatus 430 receives the content list from the content reproduction apparatus 230 via the communication unit 434, the display unit 438 displays the received content list (step S424).

Subsequently, when the information processing apparatus 430 is instructed by a user via, for example, the input unit 432 to reproduce content in the content list displayed at the step S424, the information processing apparatus 430 transmits, to the content reproduction apparatus 230 via the communication unit 434, a request for reproduction of the content for which the instruction for reproduction is given, the request having the setting information of birth date setting accepted at the step 404 attached thereto (step S426). Besides, the request for reproduction, transmitted at the step S426, of the content for which the instruction for reproduction is given has identification information of the corresponding content attached thereto.

Subsequently, when the content reproduction apparatus 230 receives, from the information processing apparatus 430 via the communication unit 238, the request for reproduction of the content for which the instruction for reproduction is given, the request having the setting information attached thereto, the calculation unit 246 calculates the age of the information processing apparatus 430, based on the setting information attached to the request for reproduction of the content for which the instruction for reproduction is given (step S428).

Subsequently, because, as a result of calculation by the content reproduction apparatus 230 of the age of the user at the step S428, the user of the information processing apparatus 430 is not a user under the age in which one is subject to restriction of reproduction of the content for which the instruction for reproduction is given, reproduction unit 250 reproduces the content for which the instruction for reproduction is given, and the output unit 242 outputs to the output device 136 the content reproduced by the reproduction unit 250 (step S430).

According to the first reproduction processing of FIG. 9, a content list excluding parental controlled content of reproducible content is displayed on the information processing apparatus 330 owned by a user such as a younger brother as a child 1, who is subject to parental control over parental controlled content. Further, a content list only including certain parental controlled content of parental controlled content is displayed on the information processing apparatus 430 owned by a user such as an elder brother as a child 2, who is not subject to parental control over certain parental controlled content of parental controlled content. Accordingly, when a user such as an elder brother as a child 2, who is not subject to parental control over certain parental controlled content of parental controlled content, wants to give an instruction for the certain parental controlled content to be reproduced, the parental lock function does not need to be disenabled. Thereby, it is possible to enhance usability for a user in content reproduction when the parental lock function of the content reproduction apparatus 230 is enabled.

[7. Second Content Reproduction Processing (Second Embodiment)]

Figure 10:
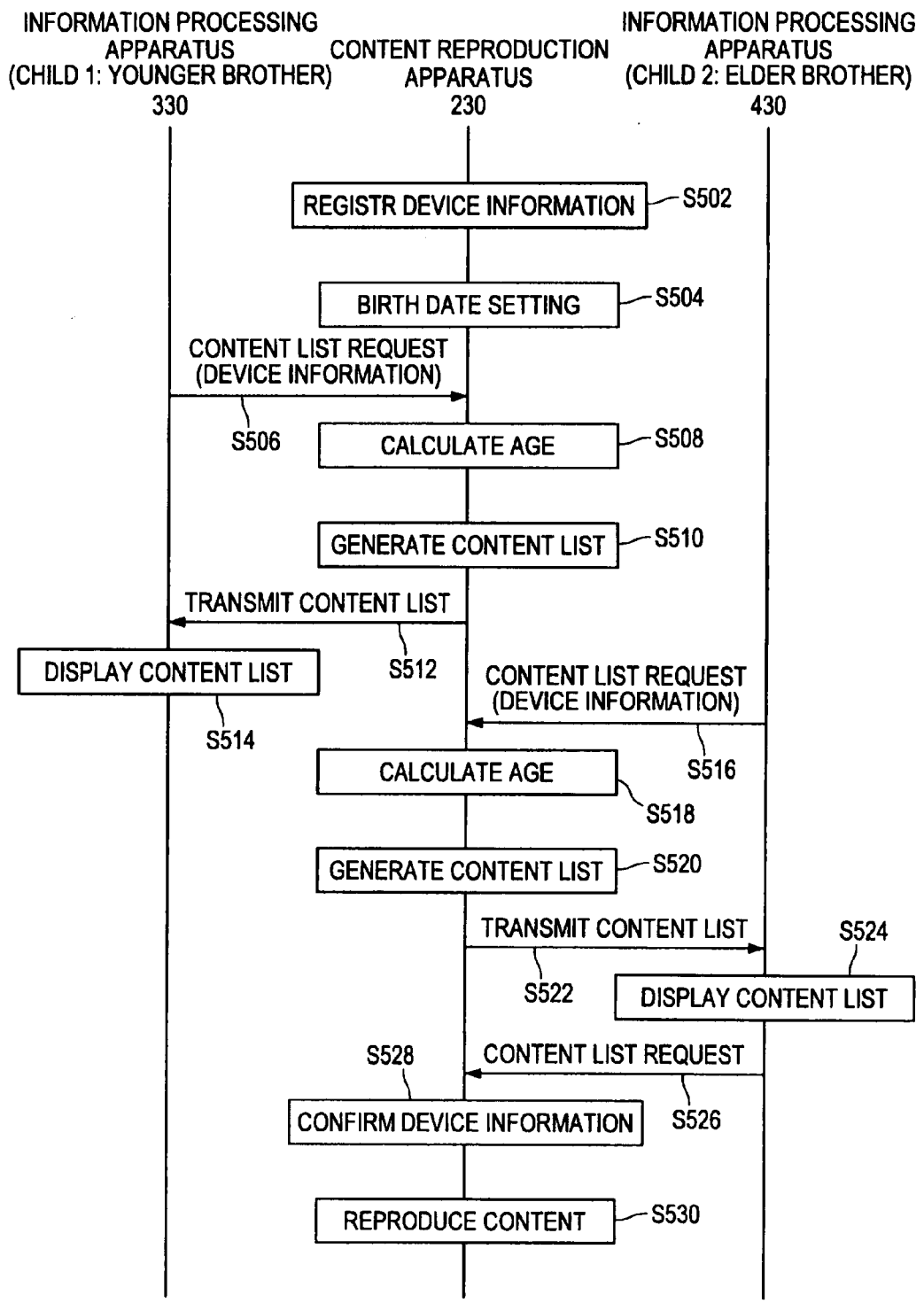
FIG. 10 is a sequence diagram of second content reproduction processing that is performed by the content reproduction apparatus and the information processing apparatus in the content reproduction system of FIG. 8.

Next, second content reproduction processing that is performed by the content reproduction apparatus 230 and the information processing apparatus 330, 430 in the content reproduction system 130 of FIG. 8 will be explained. FIG. 10 is a sequence diagram of the second content reproduction processing that is performed by the content reproduction apparatus 230 and the information processing apparatus 330, 430 in the content reproduction system 130 of FIG. 8. Besides, in the present processing, the parental lock function of the content reproduction apparatus 230 is enabled in advance.

In FIG. 10, first, the content reproduction apparatus 230 accepts from an administrator, such as a parent, of the content reproduction apparatus 230 via, for example, the input unit 236 registration of device information of the information processing apparatus 330 owned by a user such as a younger brother as a child 1, who is subject to parental control over parental controlled content, or of the information processing apparatus 430 owned by a user such as an elder brother as a child 2, who is not subject to parental control over certain parental controlled content of parental controlled content (step S502).

Subsequently, the content reproduction apparatus 230 accepts from an administrator, such as a parent, of the content reproduction apparatus 230 via, for example, the input unit 236 setting of the birth date of the younger brother with regard to the device information of the information processing apparatus 330, which was registered at the step 502. Also, the content reproduction apparatus 230 accepts from an administrator, such as a parent, of the content reproduction apparatus 230 via, for example, the input unit 236 setting of the birth date of the elder brother with regard to the device information of the information processing apparatus 430, which was registered at the step 502 (step S504).

Subsequently, when the information processing apparatus 330 is instructed by a user via, for example, the input unit 332 to display a content list, the information processing apparatus 330 transmits, to the content reproduction apparatus 230 via the communication unit 334, a request for a content list, to which the device information of the information processing apparatus 330 is attached (step S506).

Subsequently, when the content reproduction apparatus 230 receives the request for a content list from the information processing apparatus 330 via the communication unit 238, the calculation unit 246 calculates the age of the user of the information processing apparatus 330 based on the setting information of birth date setting accepted at the step S504, which has been set to the device information attached to the received request for a content list (step S508).

Subsequently, because, as a result of calculation by the content reproduction apparatus 230 of the age of the user at the step S508, the user of the information processing apparatus 330 is a user under the age in which one is subject to parental control over parental controlled content, the generation unit 248 generates a content list excluding parental controlled content of reproducible content (step S510).

Subsequently, the content reproduction apparatus 230 transmits, to the information processing apparatus 330 via the communication unit 238, the content list excluding parental controlled content of reproducible content, which was generated at the step S510 (step S512).

Subsequently, when the information processing apparatus 330 receives the content list from the content reproduction apparatus 230 via the communication unit 334, the display unit 338 displays the received content list (step S514).

On the other hand, when the information processing apparatus 430 is instructed by a user via, for example, the input unit 432 to display a content list, the information processing apparatus 430 transmits, to the content reproduction apparatus 230 via the communication unit 434, a request for a content list, to which the device information of the information processing apparatus 430 is attached (step S516).

Subsequently, when the content reproduction apparatus 230 receives the request for a content list from the information processing apparatus 430 via the communication unit 238, the calculation unit 246 calculates the age of the user of the information processing apparatus 430, based on the setting information of birth date setting accepted at the step S504, which has been set to the device information attached to the received request for a content list (step S518).

Subsequently, because, as a result of calculation by the content reproduction apparatus 230 of the age of the user at the step S518, the user of the information processing apparatus 430 is a user under the age in which one is not subject to parental control over certain parental controlled content of parental controlled content, the generation unit 248 generates a content list only including certain parental controlled content of parental controlled content in reproducible content, based on age information included in parental control information (step S520).

Subsequently, the content reproduction apparatus 230 transmits, to the information processing apparatus 430 via the communication unit 238, the content list only including certain parental controlled content of parental controlled content, which was generated at the step S520 (step S522).

Subsequently, when the information processing apparatus 430 receives the content list from the content reproduction apparatus 230 via the communication unit 434, the display unit 438 displays the received content list (step S524).

Subsequently, when the information processing apparatus 430 is instructed by a user via, for example, the input unit 432 to reproduce content in the content list displayed at the step S524, the information processing apparatus 430 transmits, to the reproduction apparatus 230 via the communication unit 434, a request for reproduction of content for which the instruction for reproduction is given, the request having the device information of the information processing apparatus 430 attached thereto (step S526). Besides, the request for reproduction, transmitted at the step S526, of the content for which the instruction for reproduction is given has identification information of the corresponding content attached thereto.

Subsequently, when the content reproduction apparatus 230 receives, from the information processing apparatus 430 via the communication unit 238, the request for reproduction of the content for which the instruction for reproduction is given, the request for reproduction having the device information of the information processing apparatus 430 attached thereto, the control unit 234 performs confirmation of the device information attached to the request for reproduction of the content for which the instruction for reproduction is given (step S528).

Subsequently, because the content reproduction apparatus 230 has performed confirmation of the device information of the information processing apparatus 430 at the step S528, the reproduction unit 250 reproduces the content for which the instruction for reproduction is given, and the output unit outputs to the output device 136 the content reproduced by the reproduction unit 250 (step S530).

According to the second reproduction processing of FIG. 10, a content list excluding parental controlled content of reproducible content is displayed on the information processing apparatus 330 owned by a user such as a younger brother as a child 1, who is subject to parental control over parental controlled content. Further, a content list only including certain parental controlled content of parental controlled content in reproducible content is displayed on the information processing apparatus 430 owned by a user such as an elder brother as a child 2, who is not subject to parental control over certain parental controlled content of parental controlled content. Thereby, the same effect as in the first content reproduction processing of FIG. 9 as described above may be achieved.

[8. Content Reproduction System (Third Embodiment)]

Figure 11:
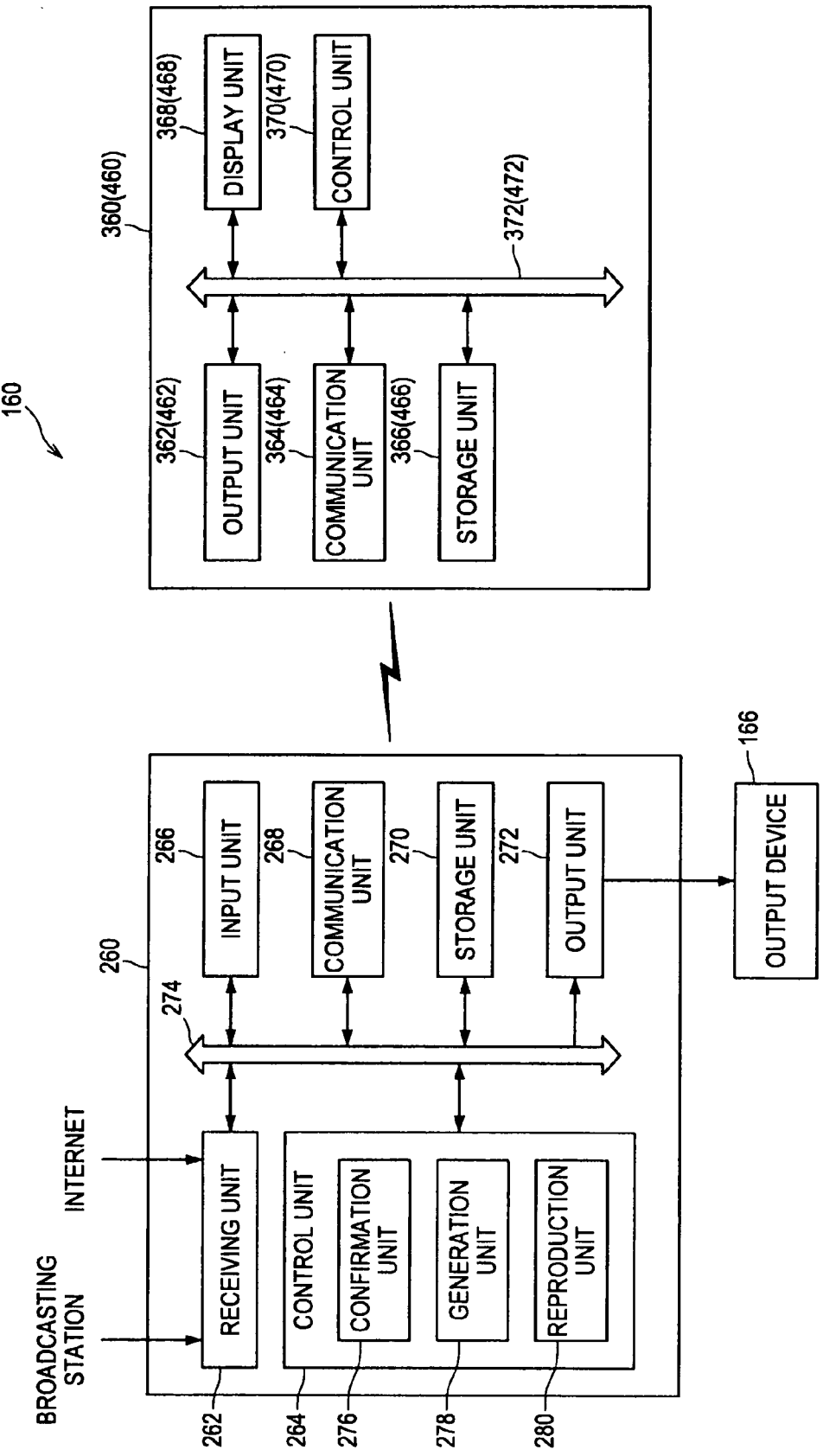
FIG. 11 is a block diagram schematically showing a configuration of a content reproduction apparatus and of information processing apparatus in a content reproduction system according to a third embodiment of the present invention.

Next, a content reproduction apparatus according to a third embodiment of the present invention will be explained. FIG. 11 is a block diagram schematically showing a configuration of a content reproduction apparatus and of information processing apparatus in the content reproduction system according to the third embodiment of the present invention.

In FIG. 11, the content reproduction system 160 includes a content reproduction apparatus 260 that reproduces content such as a broadcast program and a DVD, and information processing apparatus 360, 460 such as a cell phone. The content reproduction apparatus 260 is equipped with a parental control function, referred as to a parental lock, by which a parent restricts content that his/her child may watch, for example, in order to make it impossible for his/her child to freely watch an x-rated program or the like. In the present embodiment, the information processing apparatus 360 is an information processing apparatus owned by a user such as a child 1, who is subject to parental control over content to which parental control information is attached by a broadcaster or the like (hereafter, referred as to "parental controlled content"). The information processing apparatus 460 is an information processing apparatus owned also by a user such as a child 2, who is subject to parental control over parental controlled content.

The content reproduction apparatus 260 receives content such as a broadcast program from a broadcasting station. Also, the content reproduction apparatus 260 receives content such as a broadcasting program via the Internet. Besides, parental control information is attached by a broadcaster or the like to content such as an x-rated program, which a parent does not probably want his/her child to watch, of the content received from the broadcasting station or via the Internet.

The information apparatus 360, 460 may receive, by requesting a list of reproducible content (hereafter, simply referred as to a "content list") from the content reproduction apparatus 260, a content list from the content reproduction apparatus 260. Further, the information processing apparatus 360, 460 display the received content list. And when the information processing apparatus 360 or 460 is instructed by a user to reproduce content in the content list, the information processing apparatus 360 or 460 may request the content reproduction apparatus 260 to reproduce the corresponding content.

Further, the content reproduction apparatus 260 includes a receiving unit 262, a control unit 264, an input unit 266, a communication unit 268, a storage unit 270, and output unit 272, and also includes a bus 274, to which the receiving unit 262, the control unit 264, the input unit 266, the communication unit 268, the storage unit 270, and the output unit 272 are connected.

The receiving unit 262 receives content such as a broadcast program from a broadcasting station. Further, the receiving unit 262 receives content such as a broadcast program via the Internet.

The control unit 264 performs control over each unit of the content reproduction apparatus 260. Further, the control unit 264 includes a confirmation unit 276, a generation unit 278, and a reproduction unit 280. When later-described device information is attached to a request for a content list or a request for reproduction of content, which has been received from the information processing apparatus 360 or 460, the confirmation unit 276 performs confirmation of the device information. The generation unit 278 removes parental controlled content of reproducible content, and generates a content list including any content to which the transmission allowance setting has been set with regard to the device information of the information processing apparatus 360 or 460. The reproduction unit 280 reproduces content for which an instruction for reproduction is given.

The input unit 266 accepts operation input of a user. For example, the input unit 266 accepts input of a passcode for enabling or disenabling a parental lock function.

The communication unit 268 is an example of a first receiving unit or a first transmitting unit of the present invention, and receives a content list or a request for reproduction of content, which has been transmitted from the content reproduction apparatus 360 or 460.

When an instruction for content such as a broadcast program, received by the receiving unit 262, to be recorded is given, the storage unit 270 stores the corresponding content. Further, when storing parental controlled content, the storage unit 270 stores parental controlled content, after associating the parental controlled content with parental control information.

The output unit 272 outputs to an output device 166 the content reproduced by the reproduction unit 280. The output device 136 performs video or audio output of content which has been input.

On the other hand, the information processing apparatus 360 (460) includes an input unit 362 (462), a communication unit 364 (464), a storage unit 366 (466), a display unit 368 (468), and a control unit 370 (470), and also includes a bus 372 (472), to which the input unit 362 (462), the communication unit 364 (464), the storage unit 366 (466), the display unit 368 (468), and the control unit 370 (470) are connected.

The input unit 362 (462) accepts operation input of a user. For example, the input unit 362 (462) accepts a user instruction for a content list to be displayed.

The communication unit 364 (464) is an example of a second receiving unit or a second transmitting unit of the present invention, and receives a content list transmitted from the content reproduction apparatus 260. Further, the communication unit 364 (464) transmits to the content reproduction apparatus 260 a request for a content list or a request for reproduction of content.

The storage unit 366 (466) stores device information, which will be described later. The display unit 368 (468) displays a content list received from the content reproduction apparatus 230. The control unit 370 (470) performs control over each unit of the information processing apparatus 360 (460).

[9. Content Reproduction Processing (Third Embodiment)]

Figure 12:
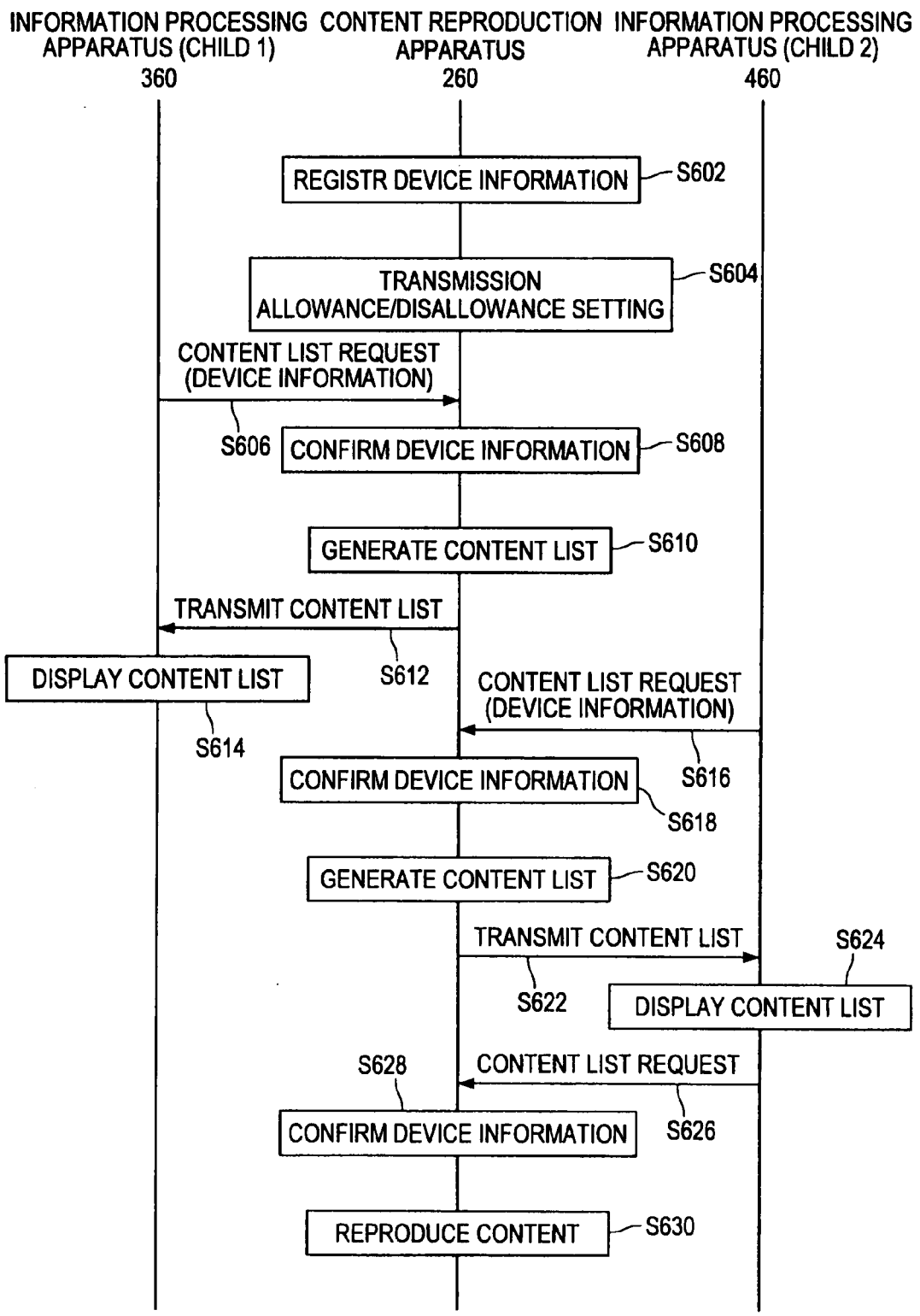
FIG. 12 is a sequence diagram of content reproduction processing that is performed by the content reproduction apparatus and the information processing apparatus in a content reproduction system of FIG. 11.

Next, content reproduction processing that is performed by a content reproduction apparatus 260 and information processing apparatus 360, 460 in a content reproduction system 160 of FIG. 11 will be explained. FIG. 12 is a sequence diagram of the content reproduction processing that is performed by the content reproduction apparatus 260 and the information processing apparatus 360, 460 in the content reproduction system 160 of FIG. 11. Besides, in the present processing, the parental lock function of the content reproduction apparatus 260 is enabled in advance.

In FIG. 12, first, the content reproduction apparatus 260 accepts from an administrator, such as a parent, of the content reproduction apparatus 260 registration of device information of the information processing apparatus 360 owned by a user such as a child 1, who is subject to parental control over parental controlled content, and of the information processing apparatus 460 owned by a user such as a child 2, who is subject to parental control over parental controlled content (step S602).

Subsequently, the content reproduction apparatus 260 accepts from an administrator, such as a parent, of the content reproduction apparatus 260 via, for example, the input unit 266 transmission allowance setting for allowing transmission of any content or transmission disallowance setting for disallowing transmission of any content with regard to the device information of the information processing apparatus 360 or 460, which was registered at the step 602 (step S604). For example, as shown in FIG. 13, "SUHAITER-MAN" in a content list 502 is parental controlled content to which parental control 504 is applied, but transmission allowance setting has been set to the information processing apparatus 360 owned by a child 1 (510). Further, the parental control 504 is not applied to "TIE-HARD" in the content list 502, but the transmission allowance setting has been set only to an information processing apparatus (not shown) owned by a parent (506). Also, the parental control 504 is not applied to "MEN IN WHITE" in the content list 502, but the transmission allowance setting has been set only to an information processing apparatus (not shown) owned by a parent 2 (508). Further, "A. T." in the content list 502 is parental controlled content to which parental control is applied, and the transmission allowance setting has been set only to the information processing apparatus (not shown) owned by the parent 1 (506). The above setting may be set when programming recording of any content, or may be set when purchasing content via the Internet. Further, the above setting may be manually set, or may be automatically set by the content reproduction apparatus 260. Examples of the case where the setting is automatically set by the content reproduction apparatus 260 include a case where the transmission allowance setting is performed with regard to a purchaser of content, and so on. Further, examples of the case where the setting is manually set include a case where, when it is parental controlled content but a child is allowed to view the parental controlled content, the transmission allowance setting is performed with regard to the child, and so on.

Subsequently, when the information processing apparatus 360 is instructed by a user via, for example, the input unit 362 to display a content list, the information processing apparatus 360 transmits, to the content reproduction apparatus 260 via the communication unit 364, a request for a content list, to which the device information of the information processing apparatus 360 is attached (step S606).

Subsequently, when the content reproduction apparatus 260 receives the request for a content list from the information processing apparatus 360 via the communication unit 268, the confirmation unit 276 performs confirmation of the device information attached to the received request for a content list (step S608).

Subsequently, the reproduction apparatus 260 performs confirmation of the device information of the information processing apparatus 360 at the step S608. And the generation unit 278 removes parental controlled content of reproducible content, and generates a content list including any content to which the transmission allowance setting has been set at the step S604 with regard to the device information of the information processing apparatus 360 (step S610).

Subsequently, the content reproduction apparatus 260 transmits, to the information processing apparatus 360 via the communication unit 268, the content list which excludes parental controlled content of reproducible content and which includes any content to which the transmission allowance setting has been set at the step S604 with regard to the device information of the information processing apparatus 360, the content list having been generated at the step S610 (step S612).

Subsequently, when the information processing apparatus 360 receives the content list from the content reproduction apparatus 260 via the communication unit 364, the display unit 368 displays the received content list (step S614).

On the other hand, when the information processing apparatus 460 is instructed by a user via, for example, the input unit 462 to display a content list, the information processing apparatus 460 transmits, to the content reproduction apparatus 260 via the communication unit 464, a request for a content list, to which the device information of the information processing apparatus 460 is attached (step S616).

Subsequently, when, the content reproduction apparatus 260 receives the request for a content list from the information processing apparatus 460 via the communication unit 268, the confirmation unit 276 performs confirmation of the device information attached to the received request for a content list (step S618).

Subsequently, the content reproduction apparatus 260 performs confirmation of the device information of the information processing apparatus 460 at the step S618. The generation unit 278 removes parental controlled content of reproducible content, and generates a content list including any content to which the transmission allowance setting has been set at the step S604 with regard to the device information of the information processing apparatus 460 (step S620).

Subsequently, the content reproduction apparatus 260 transmits, to the information processing 460 via the communication unit 268, the content list which excludes parental controlled content of reproducible content and which includes any content to which the transmission allowance setting has been set at the step 604 with regard to the device information of the information processing apparatus 460, the content list having been generated at the step S620 (step S622).

Subsequently, when the information processing apparatus 460 receives the content list from the content reproduction apparatus 260 via the communication unit 464, the display unit 468 displays the received content list (step S624).

Subsequently, when the information processing apparatus 460 is instructed by a user via, for example, the input unit 462 to reproduce a content list displayed at step S624, the information processing apparatus 460 transmits, to the content reproduction apparatus 260 via the communication unit 464, a request for reproduction of content for which the instruction for reproduction is given, the request having the device information of the information processing apparatus 460 attached thereto (step S626). Besides, the request for reproduction, transmitted at the step S626, of the content for which the instruction for reproduction is given has identification information of the corresponding content attached thereto.

Subsequently, when the content reproduction apparatus 260 receives, from the information processing apparatus 460 via the communication unit 268, the request for reproduction of the content for which the instruction for reproduction is given, the request having the device information of the information processing apparatus 460 attached thereto, the confirmation unit 276 performs confirmation of the device information attached to the request for reproduction of the content for which the instruction for reproduction is given (step S628).

Subsequently, because the content reproduction apparatus 260 has performed confirmation of the device information of the information processing apparatus 460 at the step S628, the reproduction unit 280 reproduces the content for which the instruction for reproduction is given, and the output unit 272 outputs to the output device 166 the content reproduced by the reproduction unit 280 (step S630).

According to the content reproduction processing of FIG. 12, a content list which excludes parental controlled content of reproducible content and which includes any content to which the transmission allowance setting has been set with regard to the device information of the information processing apparatus 360 is displayed on the information processing apparatus 360 owned by a user such as a child 1, who is subject to parental control over parental controlled content. Also, a content list which excludes parental controlled content of reproducible content and which includes any content to which the transmission allowance setting has been set with regard to the device information of the information processing apparatus 460 is displayed on the information processing apparatus 460 owned by a user such as a child 2, who is subject to parental control over parental controlled content. Further, a content list which includes parental controlled content of reproducible content, as well as, any content to which transmission allowance setting has been set with regard to device information of an information processing apparatus (not shown) and which excludes any content to which transmission disallowance setting has been set is displayed on an information processing apparatus owned by a user such as parent 1 and 2, who is not subject to parental control over parental controlled content. Accordingly, when a user such as a parent 1 and 2, who is not subject to the parental control over parental controlled content, wants to given an instruction for parental controlled content to be reproduced, the parental lock function of the content reproduction apparatus 260 does not need to be disenabled. Thereby, it is possible to enhance usability for a user in content reproduction when the parental lock function of the information processing 260 is enabled.

Further, according to the content reproduction processing of FIG. 12, it is possible to set transmission allowance setting or transmission disallowance setting to any content for each user. Therefore, for example, an administrator of the content reproduction apparatus 260 may make it impossible for an elderly user to reproduce content containing materials which put, for example, the heart under strain.

Moreover, embodiments of the present invention may be also implemented by providing a system or a device with a recoding medium storing program codes of software that realizes functions of each of the above embodiments and by causing the computer (or CPU, MPU, or the like) of the system or the device to read out and to execute the program codes stored in the recoding medium.

In this case, the program codes itself, which is read out from the recoding medium, realize functions of each of the above embodiments, and the program codes and the recoding medium storing the program codes constitute the present invention.

Further, as a recoding medium for providing program codes, for example, a floppy disk (registered trademark), a hard disk, a magneto-optical disk, an optical disk such as a CD-ROM, a CD-R, a CD-RW, a DVD-ROM, a DVD-RAM, a DVD-RW, and a DVD+RW, a magnetic tape, a nonvolatile memory card, a ROM, and the like may be used. Alternatively, program codes may be downloaded via a network.

Furthermore, functions of each of the above embodiments may be realized not only by executing program codes read out by a computer, but also by causing, based on instructions of such program codes, an operating system (OS) running on the computer to perform a part or whole parts of actual processing.

Moreover, functions of each of the above embodiments may be realized, after program codes read out from a recoding medium are written into a memory provided on an extension board inserted into a computer or which is provided in an extension unit connected to a computer, by causing, based on instructions of such program codes, a CPU or the like provided on the extension board or in the extension unit to perform a part or whole parts of actual processing.

It should be understood by those skilled in the art that various modifications, combinations, sub-combinations and alterations may occur depending on design requirements and other factors insofar as they are within the scope of the appended claims or the equivalents thereof.

For example, it is possible to combine the first embodiment, the second embodiment, and the third embodiment of the present invention with each other appropriately.

The present application contains subject matter related to that disclosed in Japanese Priority Patent Application JP 2010-014193 filed in the Japan Patent Office on Jan. 26, 2010, the entire content of which is hereby incorporated by reference.

What is claimed is:

1. A content reproduction system comprising:
a content reproduction apparatus including a first processor that
  accepts input of device information of an information processing apparatus for a user as predetermined information, in which the information processing apparatus is external to the content reproduction apparatus, and in which the information processing apparatus and the content reproduction apparatus are configured to communicate with each other,
  accepts setting input of display allowance setting information which allows display of a content list including all reproduction content or display disallowance setting information which disallows display of the content list including all reproducible content with regard to the accepted device information,
  receives a request for a list of reproduction content and a request for reproduction of content, which are transmitted from the information processing apparatus,
  confirms second predetermined information attached to the request for a content list, which has been received by the first processor, to obtain a confirmation result, wherein the confirmation result depends on the device information of the information processing apparatus set as the second predetermined information attached to the request for the content list,
  generates a content list of a plurality of content programs to be transmitted to the information processing apparatus, based on the confirmation result and the display allowance setting information or the display disallowance setting information for the information processing apparatus, in which at least one of the plurality of content programs in the content list is a parental controlled content program to which parental control information is attached, and in which the parental control information is other than the display allowance setting information and the display disallowance setting information, and transmits the content list generated to the information processing apparatus; and
the information processing apparatus including a second processor that
transmits, for the user, a request for a list of reproduction content and a request for reproduction of content to the content reproduction apparatus, wherein each of the requests for the user has the device information for the information processing apparatus attached thereto,
receives a content list transmitted from the content reproduction apparatus, and
displays the content list having been received by the second processor.

2. The content reproduction system to claim 1, wherein the content reproduction apparatus accepts setting input of passcode information as a part of the predetermined information.

3. The content reproduction system to claim 2, wherein the first processor generates a content list excluding the parental controlled content program when the passcode information is not verified by the first processor.

4. The content reproduction system to claim 2, wherein the passcode information for the user is other than the device information of the information processing apparatus.

5. The content reproduction system to claim 1, wherein the second processor accepts input of second display allowance setting information which allows display of a content list including all reproduction content or second display disallowance setting information which disallows display of a content list including all reproduction content as the second predetermined information, and
transmits to the content reproduction apparatus a request for a list of reproducible content and a request for reproduction of content, each of the requests having the second display allowance setting information or the second display disallowance setting information attached thereto.

6. The content reproduction system to claim 5,
wherein the first processor generates a content list including the parental controlled content to which parental control information is attached when the second display allowance setting information is confirmed by the first and generates a content list excluding the parental controlled content when the second display disallowance setting information is confirmed by the first processor.

7. The content reproduction system to claim 1,
wherein the first processor generates a content list including parental controlled content to which parental control information is attached when the display allowance setting information is confirmed by the first and generates a content list excluding the parental controlled content when the display disallowance setting information is confirmed by the first processor.

8. The content reproduction system to claim 1,
wherein the first processor accepts setting input of transmission allowance setting information for allowing transmission of any content and transmission disallowance setting information for disallowing transmission of any content with regard to the accepted device information, and
wherein the second processor transmits to the content reproduction apparatus a request for a list of reproducible content and a request for reproduction of content, each of the requests having the device information attached thereto.

9. The content reproduction system to claim 8,
wherein the first processor generates a content list to be transmitted to the information processing apparatus, based on transmission allowance setting information and transmission disallowance setting information which are set to the device information having been confirmed by the first processor.

10. A content reproduction method, comprising the steps of:
accepting, by a content reproduction apparatus, input of device information of an information processing apparatus for a user as predetermined information, in which the information processing apparatus is external to the content reproduction apparatus, and in which the information processing apparatus and the content reproduction apparatus are configured to communicate with each other,
accepting, by the content reproductions apparatus, setting input of display allowance setting information which allows display of a content list including all reproduction content or display disallowance setting information which disallows display of the content list including all reproduction content with regard to the accepted device information,
receiving, by the content reproduction apparatus, a request for a list of reproducible content, which is transmitted from the information processing apparatus;
confirming, by the content reproduction apparatus, second predetermined information attached to the received request for a content list to obtain a confirmation result, wherein the confirmation result depends on the device information of the information processing apparatus set as the second predetermined information attached to the request for the content list,
generating, by the content reproduction apparatus, a content list of a plurality of content programs to be transmitted to the information processing apparatus, based on the confirmation result and the display allowance setting information or the display disallowance setting information for the information processing apparatus, in which at least one of the plurality of content programs in the content list is a parental controlled content program to which parental control information is attached, and in which the parental control information is other than the display allowance setting information and the display disallowance setting information; and
transmitting, by the content reproduction apparatus, the generated content list to the information processing apparatus, the generated content list being for display at the information processing apparatus.

* * * * *